(12) United States Patent
Rubin

(10) Patent No.: US 7,047,226 B2
(45) Date of Patent: May 16, 2006

(54) SYSTEM AND METHOD FOR KNOWLEDGE AMPLIFICATION EMPLOYING STRUCTURED EXPERT RANDOMIZATION

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 582 days.

(21) Appl. No.: 10/206,930

(22) Filed: Jul. 24, 2002

(65) Prior Publication Data

US 2004/0024724 A1 Feb. 5, 2004

(51) Int. Cl.
*G06F 17/20* (2006.01)
*G06F 17/30* (2006.01)

(52) U.S. Cl. .............................. 706/47; 706/46; 706/55
(58) Field of Classification Search ............ 706/46–47, 706/55; 704/9, 10
See application file for complete search history.

(56) References Cited

U.S. PATENT DOCUMENTS

| | | | | | |
|---|---|---|---|---|---|
| 5,311,429 | A | * | 5/1994 | Tominaga | 704/10 |
| 6,138,112 | A | * | 10/2000 | Slutz | 707/2 |
| 2003/0105638 | A1 | * | 6/2003 | Taira | 704/275 |
| 2003/0126136 | A1 | * | 7/2003 | Omoigui | 707/10 |
| 2005/0071150 | A1 | * | 3/2005 | Nasypny | 704/9 |

OTHER PUBLICATIONS

S. H. Rubin, R. J. Rush, Jr., M. G. Ceruti, "Application of Object-Oriented Design to Knowledge Amplification by Structured Expert Randomization (KASER)", Proceedings of the Seventh International Workshop (WORDS) Jan. 7-9, 2002.*

S. H. Rubin, J. Murthy, M.G. Ceruti, M. Milanova, Z.C. Ziegler, & R.J. Rush Jr., "Third Generation Expert Systems," Proc. 2d Ann. Information Integration & Reuse Conf., pp. 27-34, 2000.

G. J. Chaitin, "Randomness and Mathematical Proof," Sci. Amer., vol. 232, No. 5, pp. 47-52, 1975.

S. H. Rubin, "New Knowledge for Old Using the Crystal Learning Lamp," Proc. 1993 IEEE Int. Conf. Sys. Man, Cybern., pp. 119-124, 1993.

(Continued)

*Primary Examiner*—Anthony Knight
*Assistant Examiner*—Sergey Datskovskiy
(74) *Attorney, Agent, or Firm*—Peter A. Lipovsky; Michael A. Kagan; Andrew J. Cameron

(57) ABSTRACT

A Knowledge Amplifier with Structured Expert Randomization (KASER) that exploits a structured expert randomization principle. One KASER embodiment allows the user to supply declarative knowledge in the form of a semantic tree using single inheritance. Another KASER embodiment includes means for automatically inducing this semantic tree, such as, for example, means for performing randomization and set operations on the property trees that are acquired by way of, for example, database query and user-interaction.

21 Claims, 25 Drawing Sheets

OTHER PUBLICATIONS

L. A. Zadeh, "Fuzzy Logic = Computing With Words," IEEE Trans. Fuzzy Syst., vol. 4, No. 2, pp. 103-111, 1996.
S. H. Rubin, "Computing With Words," IEEE Trans. Syst. Man, Cybern, vol. 29, No. 4, pp. 518-524, 1999.
Chellapilla et al., "Evolution, Neural Networks, Games, and Intelligence," Proc. IEEE, vol. 87, No. 9, pp. 1471-1496, 1999.

* cited by examiner

KASER - ANSWER

CONTEXT
ENGINE RUNS ON FOR A FEW SECONDS AFTER IT IS SHUT OFF
ENGINE LACKS POWER ON BOTH FLEET ROADS AND HILLS

ANSWER
FULE INJECTION SENSORS COULD BE BAD

STOCHASTIC MEASURE
GENERAL MEASURE: 0
SPECIFIC MEASURE: 0
PROBABILITY: 99%

STOCHASTIC MEASURE LIMIT SETTINGS
LIMIT ON THE SPECIFIC STOCHASTIC MEASURE (PER RULE): 0
LIMIT ON THE GENERAL STOCHASTIC MEASURE (PER RULE): 0

OK
TALK

| FIG. 15A | FIG. 15B |

CAR DB WITH NO RULES - K.A.S.E.R.

FILE   EDIT   ACTIONS   OPTIONS   BOOKMARK   CONTACT LIST

A C | C_A  A_C | 🖫 | 📋 | 📎 | 🔍 |

TREE
```
            ├─ WHITE SMOKE IS COMING OUT OF THE EXHAUST
            └─ BLUE SMOKE IS COMING OUT OF THE EXHAUST
         ├─ ENGINE RUNS ON FOR A FEW SECONDS AFTER IT IS SHUT OFF
         ├─ ENGINE RUNS NORMAL BUT THE GAS MILEAGE IS NOT WHAT I EXPECTED
         ├─[−] ENGINE POWER ISSUES
         │       ├─ ENGINE LACKS POWER ON BOTH FLEET ROADS AND HILLS
         │       └─ ENGINE'S POWER IS FINE ON FLAT ROADS BUT WEAK GOING UP HILLS
         ├─[+] ENGINE MOVEMENT ISSUES
         ├─[+] ENGINE SOUND ISSUES
         ├─[+] ENGINE SMELL ISSUES
         ├─[+] ENGINE FEEL
   [−] VEHICLES
         ├─[−] AUTOMATIC SHIFTING
         │       ├─[−] CARS WITH AUTOMATIC SHIFTING
         │       │       ├─ HONDA ACCORD 2000 W/AUTOMATIC SHIFTING
         │       │       ├─ NISSAN ALTIMA 2000 W/AUTOMATIC SHIFTING
         │       │       ├─ CHRYSLER CONCORDE 2000 W/AUTOMATIC SHIFTING
         │       │       └─ ACURA LEGEND 2000 WITH AUTOMATIC SHIFTING
         │       └─[+] VANS WITH AUTOMATIC SHIFTING
         └─[−] MANUAL SHIFTING
                 ├─[+] CARS WITH MANUAL SHIFTING
                 └─[+] VANS WITH MANUAL SHIFTING
```

NODE PATH
ROOT>VEHICLES>AUTOMATIC SHIFTING>CARS WITH AUTOMATIC SHIFTING>HONDA ACCORD

OPTIONS

[ ADD ]                      [ DELETE ]                      [ RENAME ]

CAR DB WITH NO RULES NOW OPENED

[START] | 📧 🖉 📋 📁 >> | ▽ CAR DB WITH NO RULES - K...

FIG. 15A

SYSTEM AND METHOD FOR KNOWLEDGE AMPLIFICATION EMPLOYING STRUCTURED EXPERT RANDOMIZATION

FEDERALLY-SPONSORED RESEARCH AND DEVELOPMENT

This invention is assigned to the United States Government and is available for licencing for commercial purposes. Licensing and technical inquiries should be directed to the Office of Patent Counsel, Space and Naval Warfare Systems Center, San Diego, Code D0012, San Diego, Calif., 92152; telephone (619)553-3001, facsimile (619)553-3821.

BACKGROUND OF THE INVENTION

1. Field of the Invention

This invention relates generally to data base processing systems and more particularly to a data mining system employing structured expert randomization.

2. Description of the Prior Art

First-generation expert systems are known in the data base processing arts as production systems where the knowledge base and inference engine are disjoint. Second-generation expert systems are improved in the art to include a rudimentary learning capability, which may be implemented by the interpretation of grids or by user query. Third-generation expert systems are further improved to provide for rule base learning through the use of deductive and inductive processes, as may be appreciated with reference to, for example, Rubin et al. [S. H. Rubin, J. Murthy, M. G. Ceruti, M. Milanova, Z. C. Ziegler, and R. J. Rush Jr., "Third Generation Expert Systems," *Proc. 2d Ann. Information Integration and Reuse Conf.*, pp. 27–34, 2000].

The theory of randomization is also well-known in the mathematical arts and has been improved by many practitioners, including, for example, Chaitin [G. J. Chaitin, "Randomness and Mathematical Proof," *Sci. Amer.*, vol. 232, no. 5, pp. 47–52, 1975], Rubin [S. H. Rubin, "New Knowledge for Old Using the Crystal Learning Lamp," *Proc. 1993 IEEE Int. Conf. Syst., Man, Cybern.*, pp. 119–124, 1993], and Zadeh [L. A. Zadeh, "Fuzzy logic=computing with words," *IEEE Trans. Fuzzy Syst.*, vol. 4, no. 2, pp. 103–111, 1996]. But non of these practitioners suggest the application of randomization theory to the structured learning problems associate with expert systems.

Chaitin and Kolmogorov first published the theory or randomization, which may be appreciated as a consequence of Gödel's Incompleteness Theorem as described by Uspenskii [V. A. Uspenskii, *Gödel's Incompleteness Theorem*, Translated from Russian, Moscow: Ves Mir Publishers, 1987]. Essential incompleteness must in principle preclude the construction of any universal knowledge base requiring only a simple referential search. All tractable learning problems must be domain specific according to Lin et al. [J-H. Lin and J. S. Vitter, "Complexity Results on Learning by Neural Nets," *Mach. Learn.*, vol. 6, no. 3, pp. 211–230, 1991], which implies that the fundamental randomization problem is unsolvable [S. H. Rubin, "Computing with Words," *IEEE Trans. Syst. Man, Cybern.*, vol. 29, no. 4, pp. 518–524, 1999]. Thus, when production rules are expressed in the form of situation/action, once a rule is found erroneous, it must be corrected through acquisition of a new rule for each correction. This is also referred to as linear learning.

As described by Feigenbaum et al. [E. A. Feigenbaum and P. McCorduck, *The Fifth Generation*. Reading, Mass.: Addison-Wesley Publishing Co., 1983], solutions to the knowledge acquisition bottleneck are the keys to the creation of intelligent software. Learning how to learn is fundamentally dependent on representing the knowledge in the form of a society of experts. Minsky's proposals led to the development of intelligent agent architectures [M. Minsky, *The Society of Mind*. New York, N.Y.: Simon and Schuster, Inc., 1987] and affirmed that the representational formalism itself must be included in the definition of domain-specific learning for scalability.

Accordingly, there remains in the art a clearly-felt need for an expert system architecture that may automatically expand the rule base without the concomitant data input burden associated with error correction needed to optimize expert system performance. An expert system that includes learning means for acquiring a rule system that functions as a larger virtual rule system with reduced error probability has, until now, been unavailable in the art. These unresolved problems and deficiencies are clearly felt in the art and are solved by this invention in the manner described below.

SUMMARY OF THE INVENTION

This invention solves these problems for the first time by exploiting a structured expert randomization principle to create a Knowledge Amplifier with Structured Expert Randomization (KASER) that permits acquisition of a rule base (learning) without the concomitant data input burden associated with error correction needed to optimize expert system performance. One KASER embodiment allows the user to supply declarative knowledge in the form of a semantic tree using single inheritance. Another KASER embodiment includes means for automatically inducing this semantic tree, such as, for example, means for performing randomization and set operations on the property trees that are acquired by way of, for example, database query and user-interaction.

It is a purpose of this invention to provide a computer-implemented system for symbolic learning. It is a feature of the system of this invention that it provides a metaphorical explanation subsystem based on the acquired knowledge.

It is another purpose of this invention to provide a computer-implemented system for conversational learning, such as, for example, learning by asking appropriate questions. It is a feature of the system of this invention that it provides probabilistically-ranked alternative courses of action that may be fused to arrive at a consensus that is relatively insensitive to occasional training errors.

In one aspect, the invention is a machine-implemented method for organizing data representing symbolic information, including the steps of (a) accepting and storing data having semantic content in a memory means, (b) adding a randomized syntax to the semantic data in the memory means, and (c) displaying data representing an inference corresponding to the semantic data on a display means.

In an exemplary embodiment, the invention is a knowledge amplifier system including input means for accepting data having semantic content, memory means coupled to the input means for storing the semantic data, processor means coupled to the memory means for adding a randomized syntax to the semantic data, and display means coupled to the processor means for displaying data representing an inference corresponding to the semantic data.

In another aspect, the invention is a computer program product including a data storage medium having embodied therein computer-readable program code means for causing a computer system to organize data representing symbolic information, including computer-readable program code means for causing a computer to accept and store data having semantic content in a memory means, computer-readable program code means for causing a computer to add a randomized syntax to the semantic data in the memory means, and computer-readable program code means for causing a computer to display data representing an inference corresponding to the semantic data on a display means.

The foregoing, together with other objects, features and advantages of this invention, may be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 4 illustrates the answer generated by the context in the solution window;

DETAILED DESCRIPTION OF THE EMBODIMENTS

Introduction

As used herein, a Knowledge Amplifier with Structured Expert Randomization (KASER) denominates a knowledge amplifier that is based on the principle of structured expert randomization. In one embodiment, the (Type I) KASER of this invention allows the user to supply declarative knowledge in the form of a semantic tree using single inheritance. In another embodiment, the (Type II) KASER of this invention includes means for automatically inducing this semantic tree, such as, for example, means for performing randomization and set operations on the property trees that are acquired by way of, for example, database query and user-interaction.

Randomization may be applied to information to reduce it to a simpler form. As is well-known, deduction represents a common form of information compression where a common generalization is employed to avoid storing all instances of a knowledge predicate. Similarly, induction represents a fuzzy form of information compression where a saved instance of a knowledge predicate that may be extended with generalization operations. Unlike deduction, induction introduces errors but the error effects propagate non-linearly with error correction, thereby accommodating an allowance for error in many application domains.

Figure 2A:
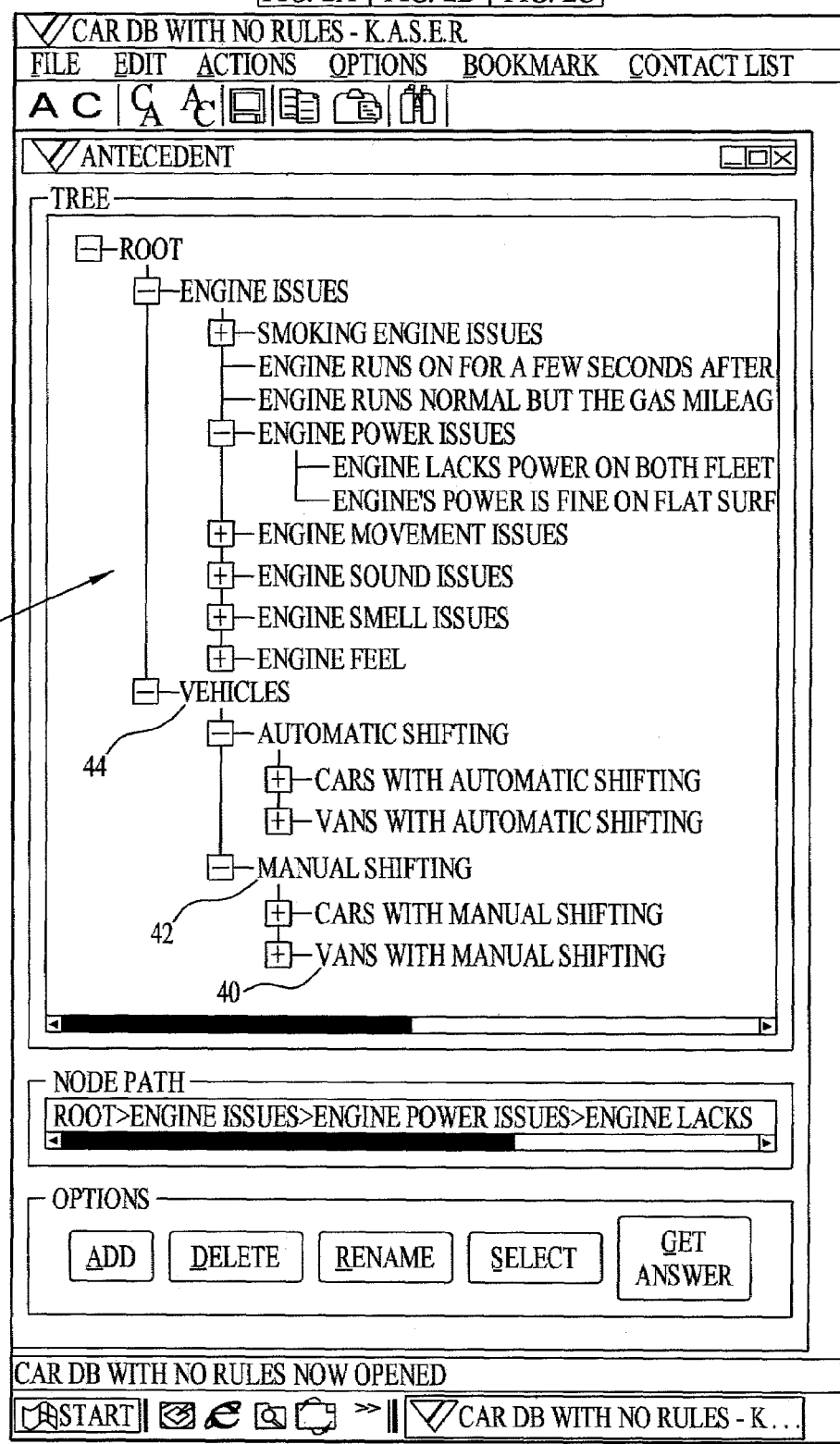
FIG. 2 is a screen-shot illustrating the declarative object trees used to represent knowledge in a Type II KASER of this invention, showing an exemplary auto-repair knowledge tree.
Figure 2B:
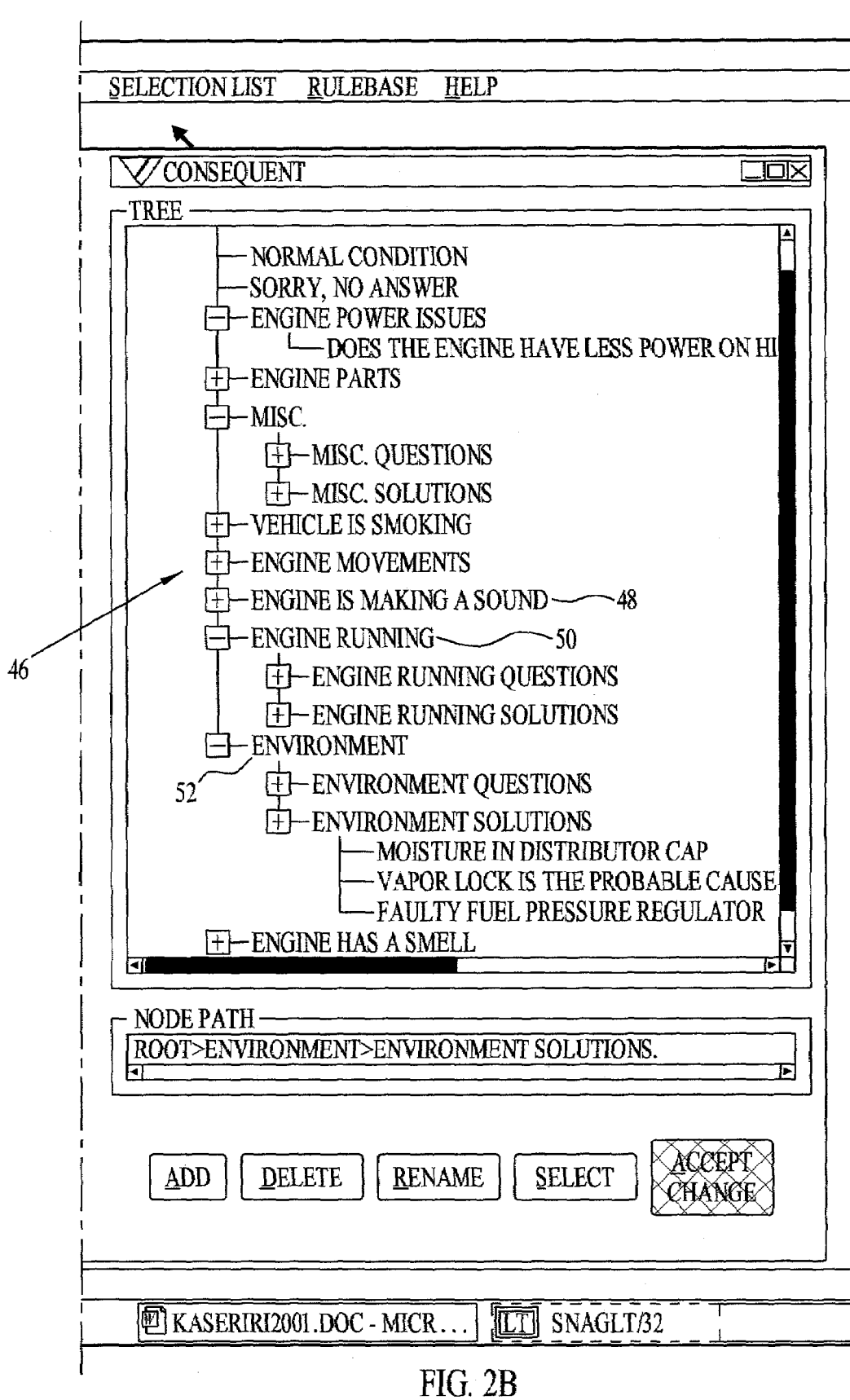
Figure 2C:
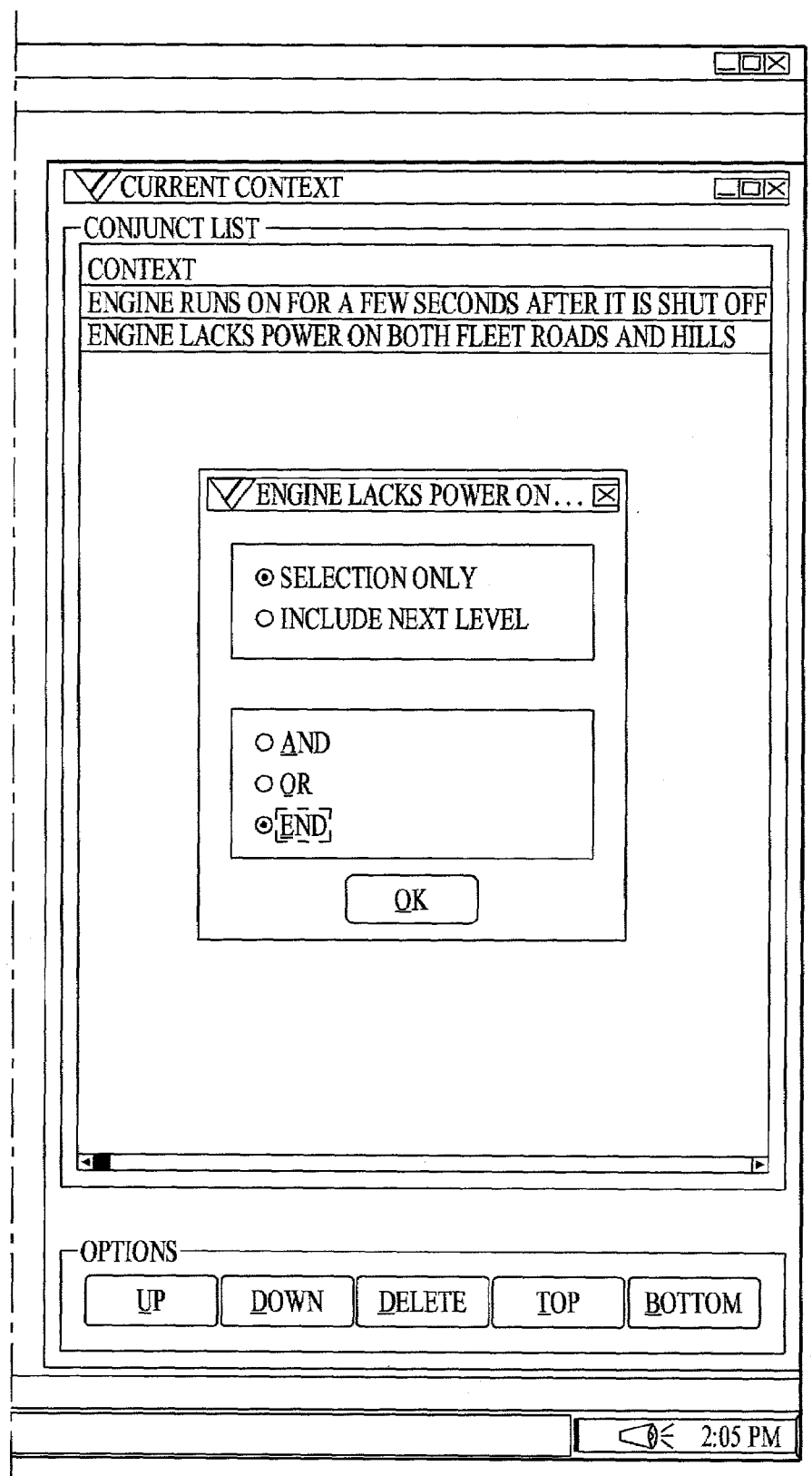

The KASER of this invention improves the conventional expert system model by improving the representational form of knowledge and the inference engine, for example. FIG. 2 illustrates the declarative object trees used to represent knowledge in a KASER, showing an exemplary auto-repair knowledge tree. The KASER may be used in most operational domains, but is most useful in symmetric domains. Thus, a KASER of this invention offers no particular advantage for learning random (non-symmetric) historical information; for example, but may be more useful in inducing correct new knowledge in more symmetric domains, such as mathematics or chess for example. Of course, no non-trivial domain is entirely random or entirely symmetric.

Figure 1:
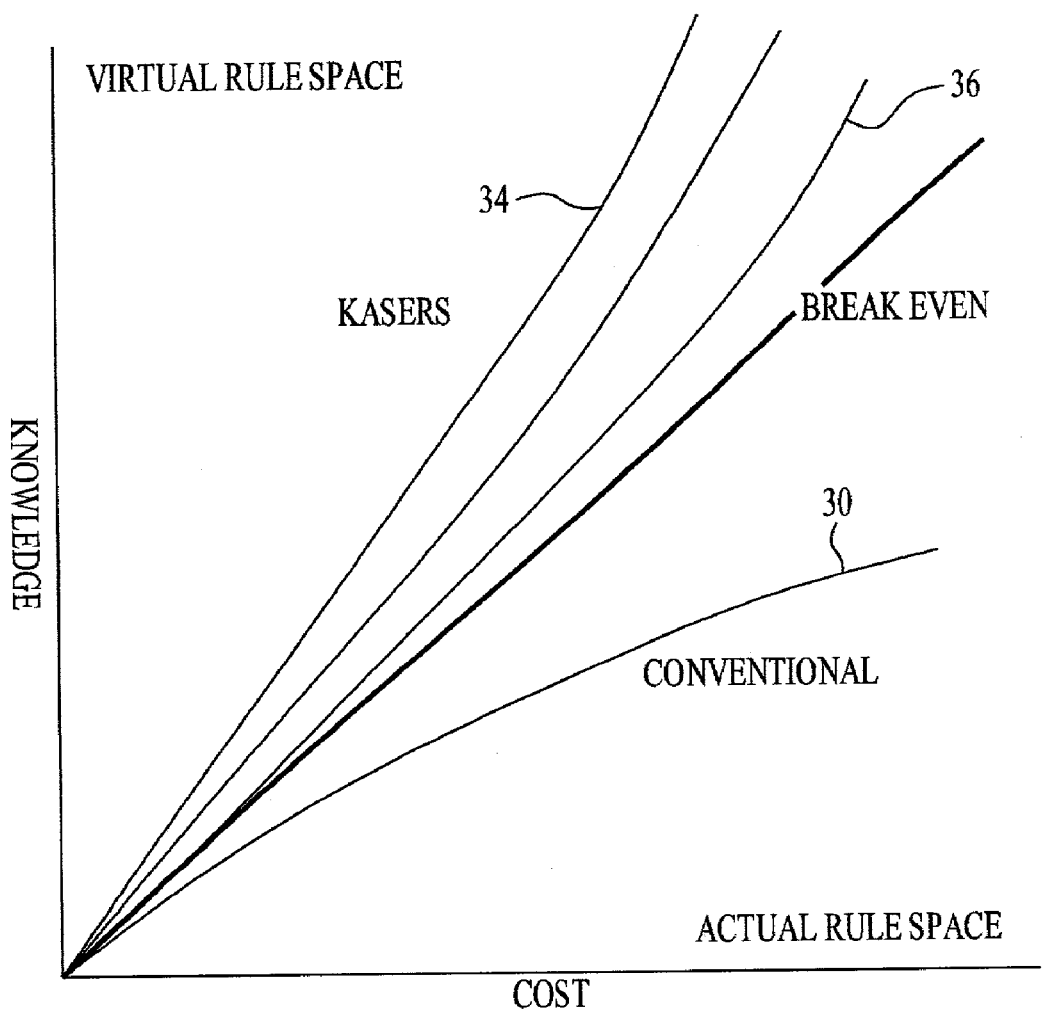
FIG. 1 is a chart illustrating the comparative cost of knowledge acquisition.

The fundamental features of a Type II KASER embodiment are now described by way of example. Unlike conventional intelligent systems, a KASER is capable of accelerated learning in symmetric domains. FIG. 1 compares knowledge acquired by an intelligent system as a function of the acquisition costs (a measure of the incremental manual effort required to add knowledge to the database). Conventional expert systems operate along the curve 30 below the breakeven line 30, because costs increase proportionately with scale so that conventional expert systems may never exceed the linear breakeven limit. The KASER, whose costs decrease proportionately with scale, operates in the region above linear breakeven limit 32 in any domain having some symmetry (non-randomness). For example, the KASER may operate along the curve 34 in a highly symmetric domain and along the curve 36 in a more random domain. Completely random (asymmetrical) domains do not exist in practice except at very small scales (nor do purely symmetric domains). Higher symmetry reduces knowledge acquisition costs in the operational domain, so the resulting curve appears higher in FIG. 1 which is not to scale because the virtual rule space is always larger than the actual rule space.

The Declarative Object Tree

Referring again to FIG. 2, the usefulness of the declarative object tree in the KASER of this invention is now described. The antecedent object tree of this invention, exemplified by the antecedent tree 38, is logically organized such that "instances" (exemplified by the object 40) are disposed under an object (exemplified by the object 42) and "generalizations" (exemplified by the object 44) are disposed above it. The degree of instantiation or generalization is determined by a tree search, which may be limited in extent by means of a user-defined "squelch." The consequent object tree of this invention, exemplified by the consequent tree 46, is logically organized such that a certain quanta of knowledge (exemplified by the object 48) points to a certain object consequent (exemplified by the object 50). Additional knowledge points to an instance of that object, if available, such as the object 52, for example. As another example (not shown), an object representing that it is cloudy and an object representing that the barometer is falling may together point to an object representing that precipitation is likely. Then, within that range, an additional object representing that the temperature is below freezing may point to a particular instance of the precipitation object representing snow. The consequent object tree 46 permits information reuse through inheritance in the usual manner. Consequents may be selected to represent a sequential composition. Objects selected from the antecedent menu 38 serve as the conjunctive context. Although FIG. 2 depicts objects such as objects 40, 42, and 44, representing words and phrases, object-oriented functions and procedures may also be represented. For example, a procedure that enumerates prime numbers may be represented as an instance of one that enumerates odd numbers.

The KASER of this invention may include any useful object-oriented (OO) tools known in the art for copying objects, moving objects, pasting (i.e., single objects), deep pasting (i.e., copying whole sub-trees), finding object nodes, suggesting next nodes based on k=1 level of look-ahead, and the like. For example, when running a pre-flight checklist, after checking the rudder, the system may look-ahead one-step and suggest checking the elevator. This operates to minimize inadvertent omissions in complex contextual specifications.

Declarative object knowledge is acquired by the KASER system through interaction with a knowledge engineer by means of a conversational learning procedure. This is a never-ending process for open domains. A simple declarative tree may in this manner evolve into a complex and sophisticated declarative object tree. As the tree evolves, the accuracy of the induced knowledge improves, provided that the domain symmetry is unchanged. For example, a conceptual object, "apple" may evolve to comprise at least two object subclasses; for example, "red apple," "green apple," and so forth, depending on the application.

The declarative object trees used to structure the property lists required for the KASER of this invention may be populated by means of a conversational learning procedure described herein below. To assist in appreciating the conversational learning description, the concepts of structured randomization are then described.

Inducing Property Lists

A KASER system according to this invention may includes means for automatically acquiring a virtual rule space (FIG. 1) that is exponentially larger than the available actual rule space with an exponentially decreasing non-zero likelihood of error. Such rule generalization means is advantageously bounded in error and also operates without a priori knowledge required of the user for other than a straightforward user-query process.

To begin the procedure, first define a production rule (e.g., using ANSI Common LISP) as an ordered pair, the first member of which is a set of antecedent predicates and the second member of which is an ordered list of consequent predicates. Predicates may be numbers (e.g., [1 . . . 2] [10 . . . 20]) or words. Previously unknown words or phrases may be recursively defined in terms of known ones. For example, the moves of a Queen in chess (e.g., unknown) may be defined in terms of the move for a Bishop (e.g., known) unioned with those for a Rook (e.g., known). This is a new property list consisting of the union of two existing property lists. Other basic set operations may also be used (e.g., intersection, difference, not, etc.) to generate new property lists from determinative combinations of existing property lists. Fuzzy set operators may also be advantageously used (e.g., "almost the same as").

In a Type I KASER, words and phrases are entered into the system by an operator by means of, for example, pull-down menus. In this manner, semantically identical concepts (e.g., Hello and Hi) may be entered with equivalent syntax by the operator to avoid diluting the learning efficiency of the KASER. In a Type II KASER, such distinct syntax maybe logically equated by the operator to yield the equivalent normalized semantics. To better appreciate this concept, consider the example of a child who may ask, "What is a bird? to which the reply is, "It is an animal that flies." to which the question is, "What is an animal?" to which the reply is, "It is a living thing." to which the question is, "What is a living thing?" to which no reply is given (i.e., a Type I delimiter, or stop marker).

Two exemplary rules and their representation follow.

$$\text{Hydrogen}\hat{}\text{Oxygen}\hat{}\text{Spark} \Rightarrow \text{Steam} \quad \text{[Eqn. 1]}$$

$$\text{Rule R1: (\{Hydrogen, Oxygen, Spark\} (Steam))} \quad \text{[Eqn. 2]}$$

$$\text{Hydrogen}\hat{}\text{Oxygen}\hat{}\text{Match} \Rightarrow \text{Steam} \quad \text{[Eqn. 3]}$$

$$\text{Rule R2: (\{Hydrogen, Oxygen, Match\} (Steam))} \quad \text{[Eqn. 4]}$$

Rules R1 and R2 may be generalized, since the consequent predicates are identical (the right-hand-sides (RHSs) of Eqns. 2, 4 are equivalent) and the antecedent terms differ in exactly one predicate. This maybe denominated a level-1 generalization because it is one level removed from ground (axiomatic) truth. In a level-i generalization, i is the maximum level of generalization for any antecedent predicate. The need for a generalization squelch arises because contexts may be presented for which there is no matching rule in the real space. Generalizations may be recursively defined and may evolve into closed (infinite) loops without a squelch function.

One useful approach of this invention captures an arbitrary rule's context, which cannot be accomplished with property lists alone. If veristic terms such as "Warm" are generalized to such terms as "Heat" for example, then qualitative fuzziness may be captured. For example, consider the antecedent generalization A1:

$$\text{A1: (\{Heat\} \{Spark, Match\}(X001 Explosive-Gas-Igniter))} \quad \text{[Eqn. 5]}$$

Generalization, A1, says that antecedent predicate, "Heat" is more general than either a Spark or a Match. This is equivalent to Heat>>{Spark, Match}, where the operator ">>" denotes ancestral generalizations. The general predicate may be initialized as X00i, for example, which is replaced after relevant interactive query with a user. This avoids printing out the next-level expansions for the user to review for expunging redundant 'at-least-as-specific' rules.

The common property list follows the set of instances. In this example, it says that a Spark or a Match may be generalized to Heat because they share the property of being an Explosive-Gas-Igniter. Properties are dynamic and must be hierarchically represented, augmented, and randomized. Property lists are subject to set operations (e.g., intersection). Properties may be acquired by way of database and/or user query.

Consequent terms, being sequences, are treated as immutable terms. This facilitates rule reuse through the automatic creation of a hierarchy of consequent definitions. First, a pair of rules having identical left-hand sides (LHSs) is selected:

Consider:

$$R3: (\{Hydrogen, Oxygen, Heat\} (Steam)) \qquad [Eqn. 6]$$

$$R4: (\{Hydrogen, Oxygen, Heat\} (Light, Heat)\} \qquad [Eqn. 7]$$

An attempt is now made to generalize the consequent sequences with the following result.

$$C1: ((Energy) ((Steam) (Light Heat))(X002 \text{ Power-Source})) \qquad [Eqn. 8]$$

In Eqn. 8, the properties of Steam intersect those of Light and Heat to yield the property, Power-Source. Thus, a property of Energy, in the current context at least, is that it is a Power Source. Rules R3 and R4 may now be replaced by a valid generalization, R5:

$$R5: (\{Hydrogen, Oxygen, Heat\} (Energy)) \qquad [Eqn. 9]$$

Additional learning may operate to correct latent errors. Also, as the level of randomization increases on the LHS and RHS, the prospects for matching rules (and thereby inducing new generalizations) increases through feedback. Consequent randomization brings the consequents into a normal form, which then serves to increase the chances for new antecedent generalizations, because more RHSs may be equated. Antecedent randomization effects are similar.

Consider the effect on Eqn. 9, when Rule R6 is newly acquired and appears as follows, after substitution using Eqn. 8.

$$R6: (\{Candle, Match\} (Energy)\} \qquad [Eqn. 10]$$

The KASER attempts to randomize the knowledge as much as possible. Using Eqns. 5 and 8 leads to the level-1 conjecture of Eqn. 11, which replaces Eqn. 10.

$$R7: (\{Candle, Heat\} (Energy)) \qquad [Eqn. 11]$$

R7 need not be generalized with R6. This is because {Match, Heat} is the same as {Match, Spark, Match}, which of course reduces to Heat and is already captured by R7.

Learning by the KASER system of this invention is now described. Suppose the user asks the system what happens if a spark is applied to a Candle. While this may seem a plausible method for lighting a Candle, it is not usually successful. Thus, to avoid error, the user must report to the system the correct consequent for this action:

$$R8: (\{Candle, Spark\} (No-Light)) \qquad [Eqn. 12]$$

Eqn. 12 is a level-1 generalization and a more-specific rule than is Eqn. 11, which is at level-0. Thus, Eqn. 12 should preferentially execute over Eqn. 11, which preference may be implemented by using a 'most-specific' agenda test that executes the most specific available rule.

The learning process then continues to correct the properties list so that Matches and Sparks are differentiated in the context of lighting a candle. The following property (i.e., LISP) list is obtained.

$$P1: (Match \text{ Explosive-Gas-Igniter Wick-Lighter}) \qquad [Eqn. 13]$$

$$P2: (Spark \text{ Explosive-Gas-Igniter}) \qquad [Eqn. 14]$$

Because Heat is a superclass of Match, its property list is unioned with the new property(s)—Wick-Lighter. Suppose, at this point, the user poses the same question, "What happens if a spark is applied to a candle?" Rule R7 (Eqn. 11) informs us that it lights; whereas, R8 (Eqn. 12) informs us that it does not. The inference engine may execute the appropriate rule by means of a specialization test. However, in this example, there is yet more to learn. It is known that R7 and R8 differ on the left-hand-side (LHS) in exactly one predicate and $$prop(Energy) \cap prop(No-Light) = \emptyset. \qquad [Eqn. 15]$$

The reason that the candle lights for a match, but not for a spark may be delimited by computing, prop(Match)−prop(Spark)=prop(P1)−prop(P2)=(Wick-Lighter). Rule R7 is now replaced by R7A:

$$R7A: (\{Candle, (X003 \text{ Wick-Lighter})\} (Energy)) \qquad [Eqn. 16]$$

In Eqn. 16, a property list named X003 has been substituted for Heat in Eqn. 11. Notice that X003 is necessarily a subclass of Heat. Then, anything that has all properties in the property list (i.e., X003) may presumably light a candle (e.g., a torch). Observe that the human-in-the-loop need not know why the list of properties is relevant, as the reasons are automatically discovered. Notice that a Spark may no longer light a candle and only those items having at least Wick-Lighter in their property classes may light a candle.

Consider the rule R9:

$$R9: (\{Candle, Match\} (Energy)) \qquad [Eqn. 17]$$

Clearly, this rule R9 is correct as written. Candles do indeed produce steam, light, and heat. This is an example of induction because the system has no knowledge that a candle is a hydrocarbon and hydrocarbons produce steam as a byproduct of combustion.

Such antecedent predicate generalizations maybe rendered more class-specific if desired to correct overgeneralizations by increasing the number of available generalization levels. The rule consequents are not affected thereby. For example, consider the antecedent generalization A2:

$$A2: (\{Car\} \{Ford, Fiat\}), \qquad [Eqn. 18]$$

which yields:

$$A3: (\{Car\} \{Family-Car, Sports-Car\}) \qquad [Eqn. 19]$$

$$A4: (\{Family-Car\} \{Ford\}) \qquad [Eqn. 20]$$

$$A5: (\{Sports-Car\} \{Fiat\}) \qquad [Eqn. 21]$$

Property lists may be automatically organized into a hierarchical configuration through the use of simple set operations. This means that rules may be generalized or specialized through the use of the disjunctive or conjunctive operators, respectively. Such property lists may be associatively retrieved through the use of a grammatical randomization process in any useful manner, such as, for example, the manner described by Lin et al. (supra). Moreover, matching operations then need to incorporate searching subclasses and superclasses as necessary.

Finally, it may be readily appreciated that the system of this invention may incorporate the elements of fuzzy programming known in the art. Fuzzy programming enables this system to explore a space of alternative contexts as delimited by optional consequent filters and ranked by the level of generalization used to obtain a contextual match, as may be appreciated from the discussion below.

Grammatical Randomization

Consider the following three exemplary property lists P3–P5:

$$P3: (Ice \text{ A B C}) \qquad [Eqn. 22]$$

$$P4: (Water \text{ B C D}) \qquad [Eqn. 23]$$

$$P5: (Steam \text{ C E}) \qquad [Eqn. 24]$$

In Eqns. 22–24, ice, water, and steam share a common property, C, which for example might be their chemical composition, $H_2O$. Also, ice alone has property A (e.g., solid phase), water alone has property D (e.g., liquid phase), and steam alone has property E (e.g., gaseous phase). In these examples, ice and water alone share property B (e.g., denser-than-air).

The use of a hierarchical object-representation is fundamental to the practice of this invention for specifying property lists, antecedent sets, and consequent sequences. For example, when specifying, for example, the object "aircraft carrier" all of its capabilities, subsystems, and like attributes are included implicitly in such specification so that there is no need to specify each subsystem individually. In accordance with this invention, a randomization is next developed for the property lists. It may readily be appreciated that the same randomization approach may be advantageously applied to the antecedent and consequent predicate lists as well except that object sequence-dependence must be distinguished from sequence-independence in the notation. Of course, property lists are always sequence-independent.

In this example, to specify the properties of ice or water, the three properties of each must be specified (in any sequence). This is simple only because the list-size P3–P5 is small. Consider a randomized version of the property lists, P3–P6:

P3: (Ice A Precipitation) [Eqn. 25]

P4: (Water Precipitation D) [Eqn. 26]

P5: (Steam C E) [Eqn. 27]

P6: (Precipitation B C) [Eqn. 28]

In Eqns. 25–28, the property of precipitation is randomized from the property data. If the user states property B, then the system of this invention offers the user exactly three choices (e.g., by way of a dynamic pull-down menu): B, Precipitation, or Random. The Random menu item allows the user to complete the specification using arbitrary objects to define an associative memory. Similarly, if the user selects Precipitation, then the system of this invention offers the user exactly four choices: Precipitation, Ice, Water, or Random.

Consider the following property list specifications, in keeping with the above-described nomenclature conventions:

P3A: (X004 A Precipitation) [Eqn. 29]

P4A: (X005 Precipitation D) [Eqn. 30]

In Eqns. 29–30, if the user selects Precipitation, then the system offers the user the following five choices—Precipitation, A, D, or Random, attempting to pattern-match and extrapolate the set.

In the method of this invention, randomization is based on known classifications—not arbitrary ones. Thus, in Eqns. 25–28, the randomization of P3 and P4 require that P6 be known a priori. This still allows for the use of integer identifiers.

It may be appreciated that the usefulness of the randomization technique in the system of this invention depends on its degree. The preferred method is to realize the maximal available degree of randomization. As rules are generalized, the possibilities for further predicate generalization are increased. This, in turn, implies that the substitution and subsequent refinement of property lists for predicates is increased. Finally, as a result, the virtual space of properly mapped contexts (i.e., conjectures) grows at a rapid rate. Experimental evidence to date indicates that this rate may be exponential for symmetric domains.

The inference engine, which is common to Type I and II KASERs, is now described. Basically, in a Type I KASER, conflict resolution is accomplished through the use of a hierarchical tree of objects evolved in the system of this invention by a human knowledge engineer. This defines generalization and specialization (see below); whereas, in a Type II KASER, conflict resolution is the same as in a Type I KASER, but the hierarchical property lists are evolved by the system of this invention under the supervision of the knowledge engineer. This increases the size of the virtual contextual space without sacrificing convergence in the quality of the response. In effect, declarative knowledge is randomized to yield procedural knowledge.

Active Randomization

Active randomization is the merger of property lists and grammatical randomization. Property lists may be considered as predicates that are subject to grammatical randomization. Randomized predicates allow the user to specify contexts and associated actions using minimal effort, as has been demonstrated by, for example, Lin et al. (supra).

For example, consider the properties of A to be B, C, D as expressed in Eqn. 31:

(A B C D) [Eqn. 31]

A is the randomization of B, C, D. Similarly, suppose that:

(B E F) [Eqn. 32]

and the two rules R10–11 (by antecedent differentiation):

R10: A S⇒W [Eqn. 33]

R11: X S⇒W [Eqn. 34]

Then, a randomization may be created so that:

(Q A X) [Eqn. 35]

which, being valid, implies the following by R10 and R11.

R12: Q S⇒W [Eqn. 36]

Rule R12 allows for the possibility of new rule pairings, from which the process of this invention then iterates. Thus, expanding A, X:

(Q: AUX) [Eqn. 37]

These are active transforms in the sense that whenever A or X change their membership, the properties of Q may change, and this is evidently a converging process. However, if subsequently it is said, for example, that:

R13: A S⇒T [Eqn. 38]

R14: X S⇒G [Eqn. 39]

where T and G have no properties in common (neither is a subsequence of the other), then it appears that A cannot substitute for X and vice versa.

R13: (A–X) S⇒T [Eqn. 40]

R14: (X–A) S⇒G [Eqn. 41]

So that A and X may be contracted to give:

(A: A–X) [Eqn. 42]

(X: X–A) [Eqn. 43]

These are active transforms and this is a converging process. Suppose now that T and G are such that G is a subsequence of T without loss of generality. Then it follows that A is a subset of X and may be contracted to yield:

$$(A: A \cap X) \qquad [\text{Eqn. 44}]$$

Expanding X yields:

$$(X: X \cup A) \qquad [\text{Eqn. 45}]$$

These are also active transforms but this is not necessarily a converging process. It may not diverge without bounds but it is unstable and should be viewed as an oscillatory system that in some ways may mimic brain waves. The complexity of interaction increases as the system is scaled up, leading eventually to a need for high speed parallel/distributed processing. The case for consequent differentiation is similar, except that sequences are processed instead of sets.

Object-Oriented Translation Menus

The Type I KASER requires that declarative knowledge be (dynamically) compiled in the form of object-oriented hierarchical phrase translation menus, each class, antecedent and consequent, of a bipartite predicate may be assigned relative positions in an object-oriented semantic tree according to their relationships. A declarative statement of inter-relatedness provides a basis for common-sense reasoning as is described below. The creation, maintenance, and use of the object-oriented trees according to this invention is now described.

The phrase translation menus serve as an intermediate code (e.g., as in a compiler) where English sentences may be compiled into menu commands using rule-based compiler bootstraps. KASERs may be arranged in a network configuration where each KASER may add (post) to or delete from the context of another. This greatly expands the intelligence of the network with scale and serves to define Minsky's "Society of Mind" [Minsky, supra]. Furthermore, the high-level domain-specific language(s) used to define each predicate may be compiled through a network of expert compilers. Alternatively, neural networks may be used to supply symbolic tokens at the front end.

Each antecedent or consequent phrase may be associated with a textual explanation, for example, Microsoft's Text-to-Speech engine (Version 4.0), an audio file, a photo, and/or a video file. Images maybe photographs, screen captures, drawings, etc., and they may also be annotated using arrows, numbers, etc. Voice navigation may be added as desired.

Antecedents and consequents may be captured using an object-oriented approach. The method of this invention places descriptive phrases in an object-oriented hierarchy such that subclasses inherit all of the properties of a single superclass and may include additional properties as well. Menus may beget submenus and new phrases may be acquired at any level.

Consider the partial path [office supply, paper clip] and the partial path [conductor, paper clip]. Any subclass of paper clip has very different constraints depending on its derivation. For example, anything true of paper clips in the context of their use as conductors must hold for every subclass of paper clips on that path. Unique antecedent integers may be established to be triggered by external rules. Similarly, unique consequent integers may be setup to execute external procedures. Each project is saved as a distinct file that consists of the antecedent and consequent trees, the associated rule base, and any multimedia attachments.

A tree structure and not a graph structure is appropriate because the structure should be capable of dynamic acquisition (i.e., relatively random phrases) and deletion, which cannot be accomplished in the presence of cycles due to side effects. Note that entering a new phrase on a menu implies that it is semantically distinct from the existing phrases, if any, in that menu.

A tree structure is mapped to a CFG, where the mapping process should be incremental in view of the large size of the trees. Each node or phrase is assigned a unique number, which serves to uniquely identify the path.

Each phrase may be tagged with a help file, which also serves the purposes of the explanation subsystem. This implies that conjuncts are not necessary to the purpose of the antecedent or consequent trees.

Each menu should be limited to one screen of items (e.g., 22 items) by perhaps subdividing objects dynamically into distinct classes. New submenus may be dynamically created and objects moved to or from them as needed to limit menu display population.

Three contiguous levels of hierarchy should be displayed on the GUI at any time, if available.

A marker gene, or bookmark concept allows the user to set mark points for navigational purposes.

A list of recently visited menus serves to cache navigational paths for reuse.

A global find mechanism allows the user to enter a phrase and search the tree from the root or present location and find all matches for the phrase up to a pre-specified depth. The path, which includes the phrase, if matched, is returned.

Entered phrases (i.e., including pathnames) may be automatically extrapolated where possible. This "intellisense" feature facilitates keyboard entry. It may also assist with the extrapolation of pathnames to facilitate finding or entering a phrase. Path name components may be truncated to facilitate presentation.

This invention addresses the amount of typing involved in populating a tree structure. Copy, paste, edit, and delete functions are available to copy phrases from one or more menus to another through the use of place-holding markers. Phrase submenus are not copied over because distinct paths tend to invalidate submenu contents in proportion to their depth. New integers are generated for all phrases. The returned list of objects must be manually edited for error and/or omissions because of the requirement for randomization but this maps well to natural language translation.

Disjuncts in a menu serve as analogs and superclasses serve as generalizations for an explanation subsystem. In addition, help files and path names also serve for explanatory purposes.

An "intellassist" feature allows the system to predict the next node in a contextual, antecedent, or consequent tree. Each node in a tree locally stores the address (number) of the node to be visited next in sequence. If a node has not been trained, or if the pointed-to address has been deleted without update, then a text box stating, "No Suggestion" pops up and no navigation is effected if requested. Otherwise, potentially three contiguous menus are brought up on the screen, where the rightmost menu contains the addressed node. Navigation is accomplished by clicking on a "Suggest" button. Otherwise, all navigation is manually performed by default. The user may hop from node to node using just the suggest button without registering an entry. The use of any form of manual navigation enables a "Remember" button immediately after the next term, if any, is entered. Clicking on this enabled button sets the address pointed to by the previously entered node to that of the newly entered node. The old pointer is thus overwritten. This allows for changing the item selected within the same menu and if a node (e.g., Toyota) is deleted, then all pointers to it maybe updated to the parent class (e.g., car menu), and so on up the tree (e.g., vehicle type menu).

A pull-down menu enables one of two options; namely, (1) Always Remember (by default) and (2) Remember when Told. The Remember button is not displayed under option (1), but otherwise the effect under this option is to click it whenever it may have otherwise been enabled. The system always starts at the root node of the relevant tree.

It is unnecessary to retain a historical prefix for use by the intellassist feature. There is no need to examine where the system was to determine where it should go. While potentially more accurate, this increase in accuracy is more than offset by the extra training time required, the extra space required, and that it takes a relatively long time to reliably retrain the nodes in response to a dynamic domain environment.

An A* Ordered Search Example

Expert compilers apply knowledge bases to the effective translation of user-specified semantics, as shown by, for example, Hindin (J. Hindin, "Intelligent Tools Automate High-Level Language Programming," *Computer Design*, vol. 25, pp. 45–56, 1986). But expert compilers use conventional expert systems to realize their knowledge bases. The KASER of this invention amplifies a knowledge base using, for example, an inductively-extensible representational formalism. The KASER ordered-search process of this invention is now described. The capability for symbolic learning and qualitative fuzziness are exemplary advantages of the KASER process.

1. Click on antecedent menus to specify a contextual conjunct. Alternatively, a manual "hot button" brings up the immediately preceding context for reuse or update. Renormalization is only necessary if a generalization is made—not for term deletion (see below). Iteratively normalize the context (i.e., reduce it to the fewest terms) using the tree grammar. Note that contextual normalization may be realized in linear time in the number of conjuncts and the depth of search. These are the reduction rules, which are iteratively applied in any order to allow for concurrent processing:

1) S à A|B|C . . . then replace A, B, C . . . with S just in case all of the RHS is present in the context. This step should be iteratively applied before moving on to the next one.

2) S à A . . . and A à B . . . and B à C . . . then if S, A, B, C are all present in the context, then remove A, B, C since they are subsumed by S. It is never necessary to repeat the first step after conclusion of the second.

2. Compute the specific stochastic measure. Note that the specific stochastic measure does not refer to validity—only to the creative novelty relative to the existing rules while retaining validity. For example, given the antecedent grammar: C5 à C3|C4; C4 à C1|C2:

a) {C3 C1} {{C3}, {C2 C3},} covers and matches the first {C3} at level 0. Note that the first covered match, if any, which does not have a covered superset is the one fired—a result that follows from the method of transposition.

b) {C3 C1} {{C5}, {C2 C3},} matches nothing at the level 0 expansion, so the RHS is expanded to give the result, {C3 C1} {{*C5 (C3 C4)}, {*C2 *C3},} where the C2 C3 are both primitives and *Ci may be matched, but not expanded again. (..) is used to denote disjunction. {C5} is matched at level 1. Note that at any level, only one term inside the parentheses (e.g., C3) need be covered to get a match of any one disjunct.

c) {C3 C6} {{C2}, {C5 C6},} matches nothing at the level 0 expansion, so the RHS is expanded to give the result, {C3 C6} {{*C2}, {*C5 (C3 C4), *C6}}, which matches at level 1 because (C3 OR C4) AND C6 are matched. Note that C6 is not expanded because it is pre-matched by the existing context. This economy is possible as a result of pre-normalizing the context.

d) The result of applying the method of transposition to the above step is {{C5 C6}, {C2},}.

e) Each matched {. . .} fires a consequent, which if not primitive matches exactly one row header (i.e., a unique integer) and step (2) iterates.

f) Maintain a global sum of the number of levels of expansion for each row for each consequent term. The specific stochastic measure is taken as the maximum of the number of levels of expansion used for each consequent term.

3. Exit the matching process with success (i.e., for a row) or failure based on reaching the primitive levels, a timer-interrupt, a forced interrupt, and/or using the maximum allocated memory.

4. If a sequence of consequent actions has been attached, then the sequence is pushed onto a stack in reverse order such that each item on the stack is expanded in a depth-first manner. A parenthesized sequence of actions makes clear the hierarchy. For example, ((Hold Writing Instrument (Hold Pencil With Eraser)) (Press Instrument to Medium (Write Neatly On Paper))). The subclasses are nested, which also serves explanatory purposes. Thus, for example, they represent "Hold writing instrument, press instrument to medium," at the general level and "Hold pencil with eraser, write neatly on paper," at the specific level. A companion intelligent system should be able to transform the conceptual sequences into smooth natural language (e.g., Pick up a pencil with an eraser and write neatly on a sheet of paper.) Set GSM to zero.

5. If a match is not found, then because an expanded antecedent {. . .} is already available, proceed to expand the context in a breadth-first manner (i.e., if enabled by the level of permitted generalization). Compute the general stochastic measure. Initialize the general stochastic measure to GSM. Note that the general stochastic measure is a measure of validity. Set the starting context to the context.

a) A specialized match is sought in step (2) and a generalized match is sought here. Expanding the context may lead to redundancies. For example, {*C1 *C2 *C3 *C4 C1 C2}. One solution is to merely exclude any term that is already in the (expanded) context. Stochastic accuracy is thus preserved. Any method that does not preserve stochastic accuracy shelled not be used.

b) {C5} {{*C3}, {*C2 *C3},} is not matched in step (2), so a level 1 expansion of the context is taken:

{*C5 C3 C4} {{*C3}, {*C2 *C3},} where C3 is matched at level 1.

c) {C5 C6} {{*C1}, {*C2 *C3},} matches nothing at level 0, so a level 1 expansion of the context is taken:

{*C5 C3 C4 *C6} {{*C1}, {*C2 *C3},} matches nothing at level 1, so a level 2 expansion of the context is taken:

{*C5 *C3 *C4 C1 C2 *C6} {{*C1}, {*C2 *C3},} matches C1 OR C2 AND C3 at level 2. The first covered set is the one fired (i.e., even though both sets are covered), since it does not have a covered superset. The method of transposition is then trivially executed with no resulting change in the logical ordering.

d) Each matched {. . .} fires a consequent, which if not primitive matches exactly one row header (i.e., a unique integer) and step (2) iterates.

e) Maintain a count of the maximum number of levels of expansion for the context below the initial level. The general stochastic measure is defined by GSM plus the maximum number of levels that should be expanded in the context to get the "first" (i.e., method of transposition) match. This stochastic is represented by the maximum depth for any expansion.

f) If the context is not matched, then generalize each term in the starting context one level up in the tree. Remove any redundancies from the resulting generalization. If the generalized context differs from the starting context, then add one to GSM and go to step (5). Otherwise, go to step (6). For example, the starting context {C2 C3} is generalized to yield {C4 C5}. If this now covers a {..}, then the general stochastic measure is one. Otherwise, it is subsequently expanded to yield {*C4 C1 C2 *C5 C3 C4} at the first level. Notice that the second C4 has a longer derivation, is redundant, and could never have been added here. Note too that C4 is also a sibling or analog node. If this now covers a {..}, then the general stochastic measure remains one, but the specific stochastic measure is incremented by one to reflect the additional level of specialization.

For another example, Toyota and Ford are instances of the class car. If Toyota is generalized to obtain car, which is subsequently instantiated to obtain Ford (i.e., an analog), then the general and specific stochastic measures are both one. The general stochastic measure represents the number of levels of expansion for a term in one direction and the specific stochastic measure represents the number of levels of expansion from this extrema in the opposite direction needed to get a match. The final general (specific) stochastic is taken as the maximum general (specific) stochastic over all terms.

g) Conflict resolution cannot be a deterministic process as is the case with conventional expert systems. This is because the number of predicates in any match must be balanced against the degree of specialization and/or generalization needed to obtain a match.

Thus, a heuristic approach is required. The agenda mechanism orders the rules by their size, general stochastic, and specific stochastic with recommended weights of 3, 2, and 1 respectively.

6. Exit the matching process with success (i.e., for the entire current context for a row) or failure based on reaching the primitive levels, a timer-interrupt, a forced interrupt, and/or using the maximum allocated memory. Note that a memory or primitive interrupt invokes step (5f). This enables a creative search until a solution is found or a timer-interrupt occurs. Note too that it is perfectly permissible to have a concept appear more than once for reasons of economy of reference, or to minimize the stochastic measures (i.e., provide confirming feedback). The stochastic measures also reflect the rapidity with which a concept may be retrieved.

7. Knowledge acquisition:

a) Note that new rules are added at the head.

b) If exit occurs with failure, or the user deems a selected consequent (e.g., in a sequence of consequents) in error (i.e., trace mode on), then the user navigates the consequent menus to select an attached consequent sequence, which is appropriate for the currently normalized context.

c) If the user deems that the selected "primitive" consequent at this point should be rendered more specific, then a new row is opened in the grammar and the user navigates the consequent menus to select an attached consequent sequence.

d) A consequent sequence may pose a question, which serves to direct the user to enter a more specific context for the next iteration (i.e., conversational learning). Questions should usually only add to the context to prevent the possibility of add/delete cycles.

e) Ask the user to eliminate as many specific terms (i.e., because the more general terms tends to match more future contexts) from the context as possible (i.e., and still properly fire the selected consequent sequence given the assumptions implied by the current row). A context usually consists of a conjunct of terms. This tends to delimit the generality of each term as it contributes to the firing of the consequent. However, once those antecedent terms become fewer in number for use in a subsequent row, then it becomes possible to generalize them while retaining validity. The advantage of generalization is that it greatly increases reusability. Thus, the user requires a capability to substitute a superclass for one or more terms. Note that this implies that perfectly valid rules that are entered may be replayed with specific (not general) stochastics greater than zero. This is proper, since the specific stochastic preserves validity in theory. Thus, the user may opt to generalize one or more contextual terms by backtracking their derivational paths. If and only if this is the case, step (1) is applied to normalize the result. An undo/redo capability is provided. Validated rule firings are saved in the rule base only if the associated generalization stochastic is greater than zero. The underlying assumption is that rule instances are valid. If a pure rule instance proves incorrect, then the incorrect rule should updated or purged and the relevant object class menu(s) may need repair. For example, what is the minimal context to take FIX_CAR to FIX_TIRE? A companion intelligent system could learn to eliminate and otherwise generalize specific terms (e.g., randomization theory).

f) The system should verify for the user all the other {. . .} in the current row that fires or is fired by the possibly over-generalized {. . .} when matched. Note that this could lead to a sequence of UNDOs.

For example, ({C5} A2) {({C5}A1) ({C5 C6}A2) ({C5 C7} A2, A3)} informs the user that if the new C5 acquisition is made, then A2 and not A1 is proper to fire. If correct, then the result is {{C5} A2 {C5 C7} A2, A3}. {C5 C6} A2 has been eliminated because it is redundant. Also, {C5 C7} A2, A3 is fired just in case C5 AND C7 are true—in which case it represents the most specific selection, since it is a superset of the first set. If the elimination of one or more specific terms causes one or more {. . .} to become proper supersets, then warning message(s) may be issued to enable the user to reflect on the proposed change(s). If the elimination and/or generalization of one or more specific terms enables the firing of another rule in the same row in preference to the generalized rule, then the generalization is rejected as being too general. Note that there is no need to normalize the results because they remain in normal form. Any further normalization neutralizes any necessary speedup.

g) A selected consequent number may not have appeared on the trace path so far with respect to the expansion of each consequent element taken individually. Checking here prevents cycle formation.

h) It should never be necessary to delete the LFU consequent {. . .} in view of reuse, domain specificity, processor speed, and available memory relative to processor speed. Nevertheless, should memory space become a premium, then a hierarchy of caches should be used to avoid deletions.

8. A metaphorical explanation subsystem may use the antecedent/consequent trees to provide analogs and generalizations for explanatory purposes. The antecedent/consequent paths (e.g., ROOT, fix_car, fix_tire, etc.) serve to explain the recommended action in a way similar to the use of the antecedent and consequent menus. The antecedent/consequent menus provides disjunction and "user-help" to explain any level of action on the path. Note that the system inherently performs a fuzzy logic known as computing with words [Zadeh supra] by using conjuncts, descriptive phrases, and tree structures. The virtual rule base is exponentially larger than the real one and only limited by the number of levels in the trees and by space-time limitations imposed by the hardware on breadth-first searches.

9. A consequent element could be a "do-nothing" element if necessary (i.e., a Stop Expansion). The provision for a sequence of consequents balances the provision for multiple antecedents. The selected consequent(s) should be as general of class objects as necessary to maximize the number of levels and thus the potential for reuse at each level. The consequent grammar is polymorphic, since many such grammars may act (in parallel via the Internet) on a single context with distinct, although complimentary results. Results may be fused as in a multi-level, multi-category associative memory. Multiple context-matched rules may not be expanded in parallel because there may be no way to ascribe probabilities to partially order the competing rules and because any advantage is lost to an exponential number of context-induced firings. The consequent {...}s cannot be ranked by the number of matching terms (i.e., for firing the most specific first) because the most specific terms are generally incomparable. However, a covered superset is always more specific than any of its proper subsets. Thus, the first covered set, which does not have a covered superset in the same row is the one fired. If it does have a covered superset, then the superset is fired only if it is the next covered one tested in order. It is not appropriate to tag nodes with their level, use a monotonically increasing numbering system, or any equivalent mechanism to prevent the unnecessary breath-first expansion of a node(s) because the menus are dynamic and it is prohibitively costly to renumber say a terabyte of memory. Note that node traversal here is not synonymous with node visitation. Even if parallel processors could render the update operation tractable, the search limit is necessarily set to the depth of the deepest unmatched node. The likelihood of speedup decreases with scale. The contextual terms should only be *'d if this does not interfere with their expansion—even if normalized. Let the context be given as {C5 C6} and the RHS be {C5 C7}, {C1 ... },. Clearly, if the context had *C5, then the C1 might never be matched.

10. Unlike the case for conventional expert systems, a KASER cannot be used to backtrack consequents (i.e., goal states) to find multiple candidate antecedents (i.e., start states). The problem is that the preimage of a typical goal state cannot be effectively constrained (i.e., other than for the case where the general and specific stochastics are both zero) in as much as the system is qualitatively fuzzy. Our answer is to use fuzzy programming in the forward-chained solution. This best allows the user to enter the constraint knowledge that he/she has into the search. For example, if the antecedent menus are used to specify 'CAR' and 'FUEL' for the context and the consequent is left unconstrained for the moment, then the system searches through all instances, if any, of CAR crossed with all instances of FUEL (i.e., to some limiting depth) to yield a list of fully expanded consequents. Generalization-induced system queries, or consequents that pose questions, if any, must be answered to enable this process to proceed. Thus, in view of the large number of contexts that are likely to be generated, all interactive learning mechanisms should be disabled or bypassed whenever fuzzy programming is used. Note that CAR and FUEL are themselves included in the search. Each predicate may also be instantiated as the empty predicate in the case of the antecedent menus, if user-enabled. If the only match occurs for the case of zero conjuncts, then the consequent tree is necessarily empty. A method for fuzzy programming, is to simply allow the user to split each conjunct into a set of disjuncts and expand all combinations of these to some fixed depth to obtain a list of contexts. This use of a keyword filter, described below, is optional. For example, the specification $(A \lor A' \lor !A'') \land (B \lor B') \land (C)$ yields 23 candidate contexts—including the empty predicate (i.e., if A" is primitive and allows for redundancy), which excludes the empty context. The exclamation mark, "!" directs the system to expand the non-terminal that follows it to include (i.e., in addition to itself) all of the next-level instances of its class. For example, !CAR yields (CAR TOYOTA FORD MOZDA HONDA ... $\lambda$), where lambda ($\lambda$) denotes the empty predicate and is included as a user option.

A capability for expanding to two or more levels if possible (e.g., "!!") is deemed nonessential, but permissible (e.g., for use with relatively few conjuncts). This follows because the combinatorics grow exponentially. The most successful context(s) produced by a previous trial may always be selected and the predicates expanded to another level using "!s" where desired, and the system rerun. Notice that the user may insert knowledge at each stage in this manner, allowing for a more informed and thus deeper search than otherwise possible. Moreover, the fuzzy specialization engine stochastically ranks the generalized searches to enable an accurate selection among contexts for possible rerun.

The search may be manually terminated by a user interrupt at any time. The search is not automatically terminated subsequent to the production of some limit of contexts because doing so leaves a necessarily skewed distribution of contexts—giving the user a false sense of completeness. The user should rather enter a manual interrupt and modify the query subsequently. A terminated search means that the user either needs to use a faster computer, or more likely, just narrow down the search space further and resubmit. For example, given the antecedent class definitions:
(CAR (FORD TOYOTA)) (FUEL (REGULAR_GAS HIGH_TEST DIESEL)) (AGE (OLD (TIRES ... )) (NEW (TIRES ... )))

and the contextual specification:

$(!CAR) \land (!FUEL) \land (NEW),$ then the following 35 contexts each allow for the empty predicate. Note that the use of the empty predicate is excluded by default, since its use is associated with an increase in the size of the search space and since it may not be used with the consequent menus (see below).

CAR
DIESEL
FORD
FUEL
HIGH_TEST
NEW
REGULAR_GAS
TOYOTA

CAR DIESEL
CAR FUEL
CAR HIGH_TEST
CAR NEW
CAR REGULAR_GAS
DIESEL NEW
FORD NEW
FUEL NEW
HIGH_TEST NEW
REGULAR_GAS NEW
TOYOTA FUEL
TOYOTA DIESEL
TOYOTA HIGH_TEST
TOYOTA NEW
TOYOTA REGULAR_GAS
CAR DIESEL NEW
CAR FUEL NEW
CAR HIGH_TEST NEW
CAR REGULAR_GAS NEW
FORD DIESEL NEW
FORD FUEL NEW
FORD HIGH_TEST NEW
FORD REGULAR_GAS NEW
TOYOTA DIESEL NEW
TOYOTA FUEL NEW
TOYOTA HIGH_TEST NEW
TOYOTA REGULAR_GAS NEW

The user may also have used the consequent menus to specify an optional conjunctive list of key phrases, which must be contained in any generated consequent. Those generated consequents, which contain the appropriate keywords or phrases are presented to the user in rank order—sorted first in order of increasing generalization stochastic and within each level of generalization stochastic in order of increasing specialization stochastic (i.e., best-first). For example, (general, specific) (0, 0) (0, 1) (1, 0) (1, 1) . . . . Recall that only the specific stochastic preserves validity.

The specified antecedent and consequent classes should be as specific as possible to minimize the search space. Neither the antecedent nor consequent terms specified by the user are ever generalized. For example, given the consequent class definitions:

($COST_{13}$ PER_MILE (CHEAP MODERATE EXPENSIVE)) (MPG (LOW MEDIUM HIGH)) then the space of generated consequents may be constrained in a manner similar to the constraining of the space of generated antecedents. Thus, for example:

(!CAR)∧(!FUEL)∧(NEW)à(!COST_PER$_{13}$ MILE)
∧(!MPG)

This is orthogonal programming; reusing previous paradigms unless there is good reason not to. Each candidate solution has been constrained so that it must contain at least one phrase from the four in the COST_PER$_{13}$ MILE class and at least one phrase from the four in the MPG class—including the class name, but excluding the empty predicate of course. IF an asterisk (*) is placed after the arrow, then the compiler is directed not to filter the produced consequents in any way.

The user may make changes wherever (i.e., to the antecedents, the consequents, or both) and whenever (e.g., interactively) appropriate and rerun the system query. This represents computing with words because fuzziness occurs at the qualitative level. It is not really possible for distinct classes to produce syntactically identical phrases because path names are captured using unique identifiers. The identifiers are always unique even if the represented syntax is not.

It is not deemed necessary to weight the consequent phrases because instance classes preserve validity (i.e., at least in theory) and because it is otherwise impossible to ascribe weights to combinations of words or phrases. For example, 'greased' and 'lightning' might be synonymous with fast, but taken together (i.e., 'greased lightning'), an appropriate weight should be considerably greater than the sum of the partial weights. The degree to which the conjunctive weight should be increased does not lend itself to practical determination. Moreover, this raises the question (i.e., for ranking) of which is the more significant metric—the weight or the two stochastics. Following the dictates of quantum mechanics or veristic computing, ranking consequent phrases by group instead of individually is sufficient.

Feedback produced, in the form of implausible generalizations serves to direct the knowledge engineer to modify the involved declarative class structures by regrouping them into new subclasses so as to prevent the formation of the erroneous generalizations. This too is how the system learns. An exemplary iterative pseudo-code for accomplishing the combinatorial expansion follows.

1. Initialize the list of Candidate Contexts to λ.
2. Each conjunct—e.g., (A∨A'∨!A")—in the starting list—e.g., (A∨A'∨!A")∧(B∨B')∧(C) is processed sequentially.
3. Note that !A" means to expand the disjunct to include all members of its immediate subclass, if any. Similarly, A" means to expand the disjunct to a depth of two. The provision for multilevel expansion is implementation dependent and is thus optional. Each expanded conjunct is augmented with exactly one λ if and only if the user has enabled the λ-option. This option is disabled by default.
4. Expand the first conjunct while polling for a manual interrupt. The result is:

(A∨A'∨A".a∨A".b∨λ).

5. Note that the fully expanded list of conjuncts for illustrative purposes appears:

(A∨A'∨A"∨A".a∨A".b∨λ)∧(B∨B'∨λ)∧(ⓒ ∨λ)

6. Initialize a Buffer with the disjuncts in the first conjunct. The first six buffer rows are populated.
7. Copy the contents of the buffer to the top of the list of Candidate Contexts;
8. Current Conjunct=2;
9. Note that there are three conjuncts in this example.
10. WHILE (Current Conjunct<=Number of Conjuncts) and NOT Interrupt DO
    {
11. Expand the Current Conjunct while polling for a manual interrupt.
12. Let d=the number of disjuncts in the Current Conjunct;
13. Using a second buffer, duplicate the disjuncts already in the first buffer d times. For example here, the second conjunct has three disjuncts, and thus results in the buffer:

A, A, A, A', A', A', A", . . . , λ, λ, λ

14. FOR each element i in the Buffer WHILE NOT Interrupt DO
15. FOR each Disjunct j in the Current Conjunct WHILE NOT Interrupt DO
    {
16. Buffer [i]=Buffer [i] ∥ Current Disjunct [j];
17. (For example, AB, AB', Aλ, A'B, A'B', A'λ, . . . , λB, λB', λλ.)
    }

18. IF the λ-option has been enabled THEN
    Append the contents of the buffer to the bottom of the list of Candidate Contexts while polling for a manual interrupt;
19. Current Conjunct++
    }
20. An interrupt may be safely ignored for the next two steps.
21. IF the λ-option has been enabled THEN
    Final Contexts=Candidate Contexts–λ
22. ELSE
    Final Contexts=contents of the buffer;
23. Duplicate contexts are possible due to the use of λ and possible duplicate entries by the user. Searching to remove duplicate rows is an $O(n^2)$ process. Thus, it should never be mandated, but rather offered as an interruptible user-enabled option.

The iterative pseudo-code for constraining the generated consequents follows.

1. Expand each conjunct—e.g., (A∨A'∨!A")—in the starting list—e.g., (A∨A'∨!A") ∧(B∨B')∧(C). Note that the λ-option is disabled.
2. The result is:
    (A∨A'∨A"∨A".a∨A".b)∧(B∨B')∧(C).
3. FOR each consequent sequence (i.e., rule ) WHILE NOT Interrupt DO
    {
4. match=FALSE;
5. FOR each expanded conjunct (e.e., required key concept) WHILE NOT Interrupt DO
    {
6. FOR each predicate in an expanded conjunct (e.e., PEC) WHILE NOT Interrupt DO
    {
FOR each predicated in a consequent sequence (e.e., PICS) WHILE NOT Interrupt DO
    {
8, IF PEC=PICS THEN
    {
    match=TRUE;
    BREAK;
    BREAK;
    (Each BREAK transfers control to the next statement outside of the current loop.)
    }
    }
    }
9. IF NOT match THEN BREAK
    }
10. IF NOT match THEN remove current rule from the candidate list
11. ELSE the rule is saved to the set of candidate rules, which is sorted as previously described.
    }

Some Exemplary Applications

Figure 3:
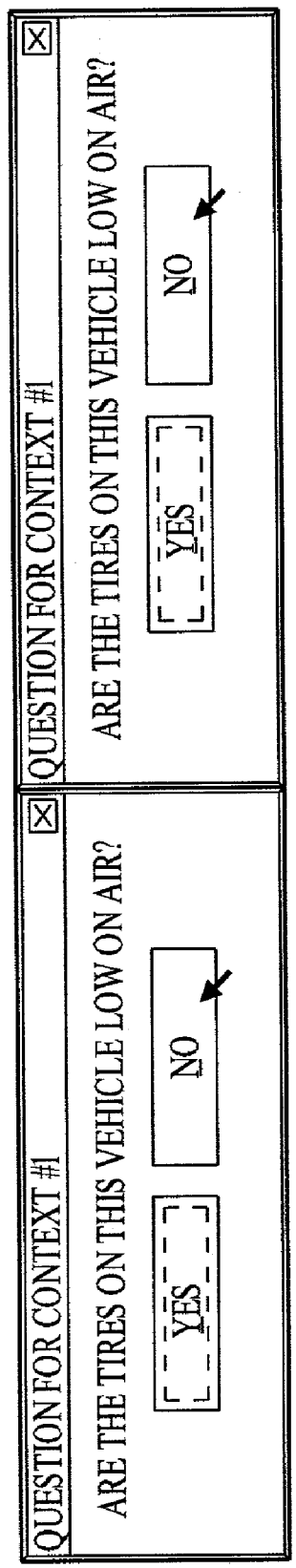
FIG. 3 illustrates the processing of a sample context presented in FIG. 2.

FIG. 3 shows the processing of a sample context presented in FIG. 2. Two questions are generated in sequence, which serve to provide additional contextual information for processing.

FIG. 4 shows the answer generated by the context, which includes the information posted by the two responses to the presented questions. In this case, both questions were replied to in the negative. Notice that the general and specific measures are both zero. This indicates that the answer is provided without the use of inductive or deductive methods respectively. In other words, only existing rules in the knowledge base have been matched and replayed. Furthermore, the respective squelches (i.e., limits) are used to limit the number of levels of induction or deduction that may be used.

Limiting the number of levels of induction means limiting system creativity. The limit of zero indicates a disallowance for creativity. For example, in domains such as clinical medicine, too much creativity may lead to unwanted answers such as "Take two cyanide capsules and call me in the morning," in response to a search for a better headache cure.

Placing limits on the permitted number of levels of deduction is a practical measure that may assist the available manual interrupt to delimit a search. More often, it is used to delimit error creep. While deduction does not introduce error in theory, theory assumes infinitely refined object trees. Because this cannot be achieved in practice, deductive operations may introduce error; although, the error introduced here is substantially less than that introduced by similar inductive operations. The limit of zero indicates no tolerance for error creep.

Microsoft Text-to-Speech is provided as royalty-free software for enunciating the context, the answer, and the stochastic measures. The use of a multi-modal response helps improve user comprehension and retention of system-generated information.

Figure 5:
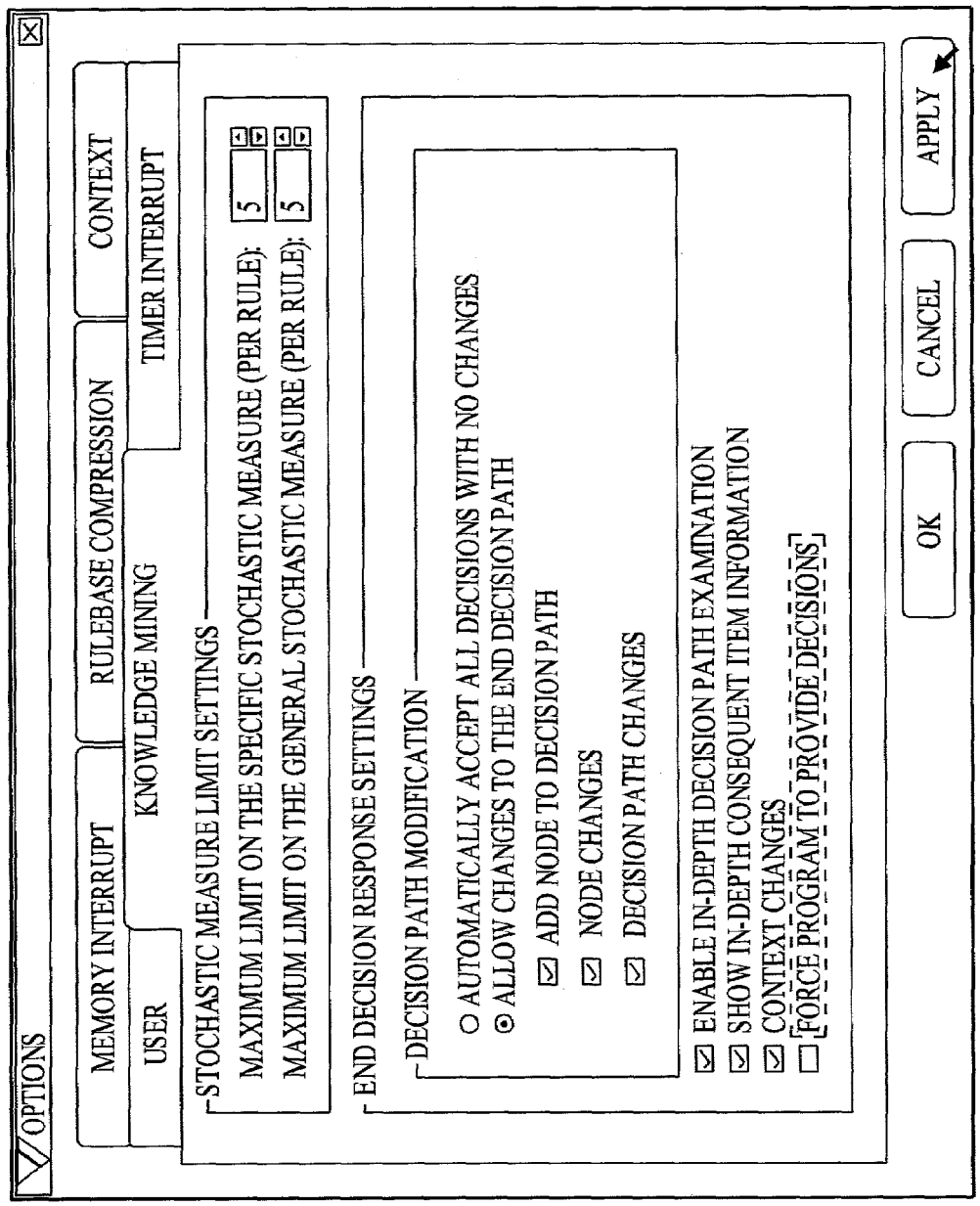
FIG. 5 illustrates a menu for selecting, enabling and changing rules.

FIG. 5 shows the Options menu where Program Options are selected. The Knowledge Mining folder is selected, for example. This is where the stochastic squelches may be set. Selecting, "Allow changes to the end decision path," allows the knowledge engineer to correct erroneous rules (see FIG. 7). Selecting, "Automatically accept all decisions with no changes," streamlines the presentation by foregoing this option.

Figure 6A:
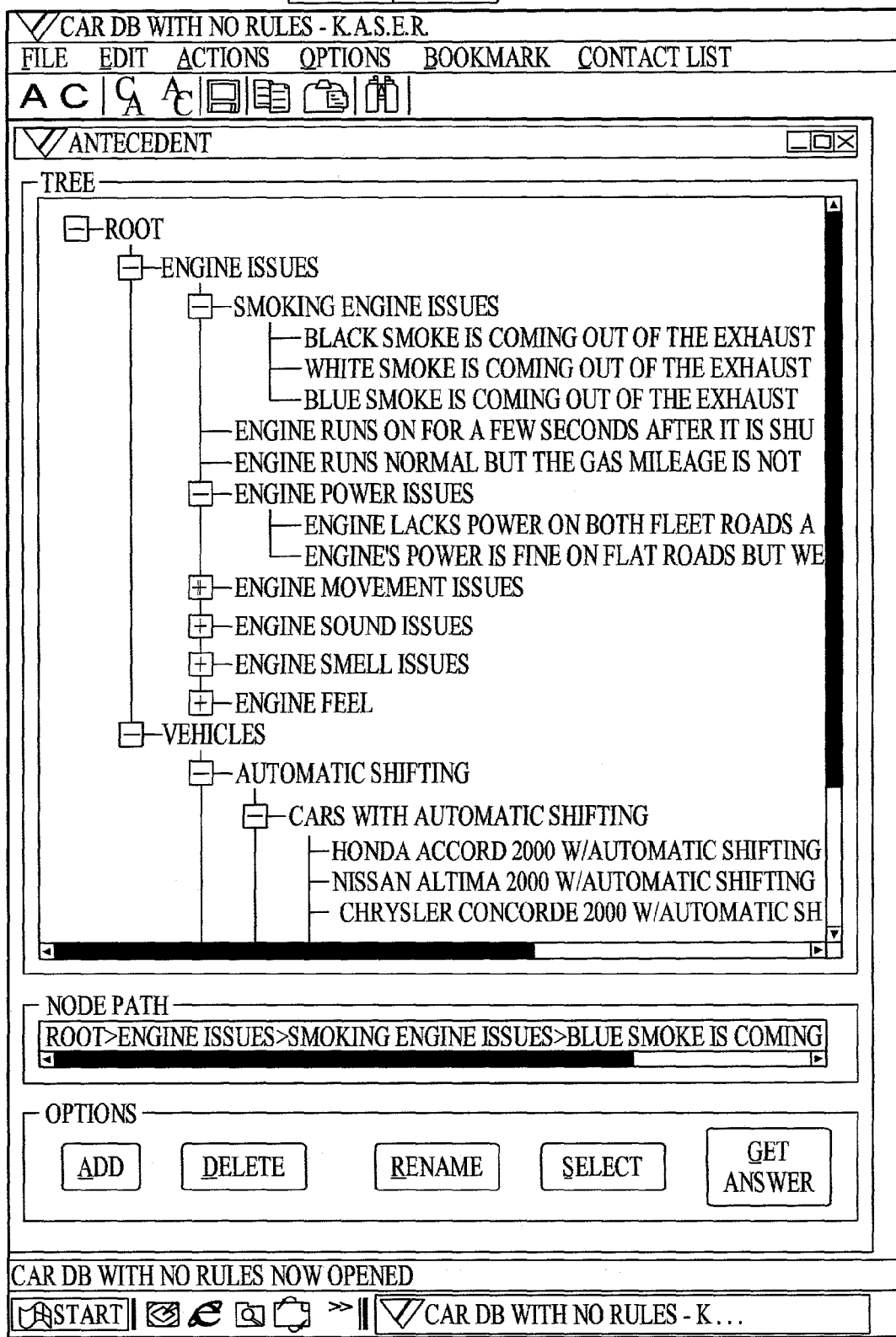
FIG. 6 illustrates a contextual specification for a qualitatively fuzzy test.
Figure 6B:
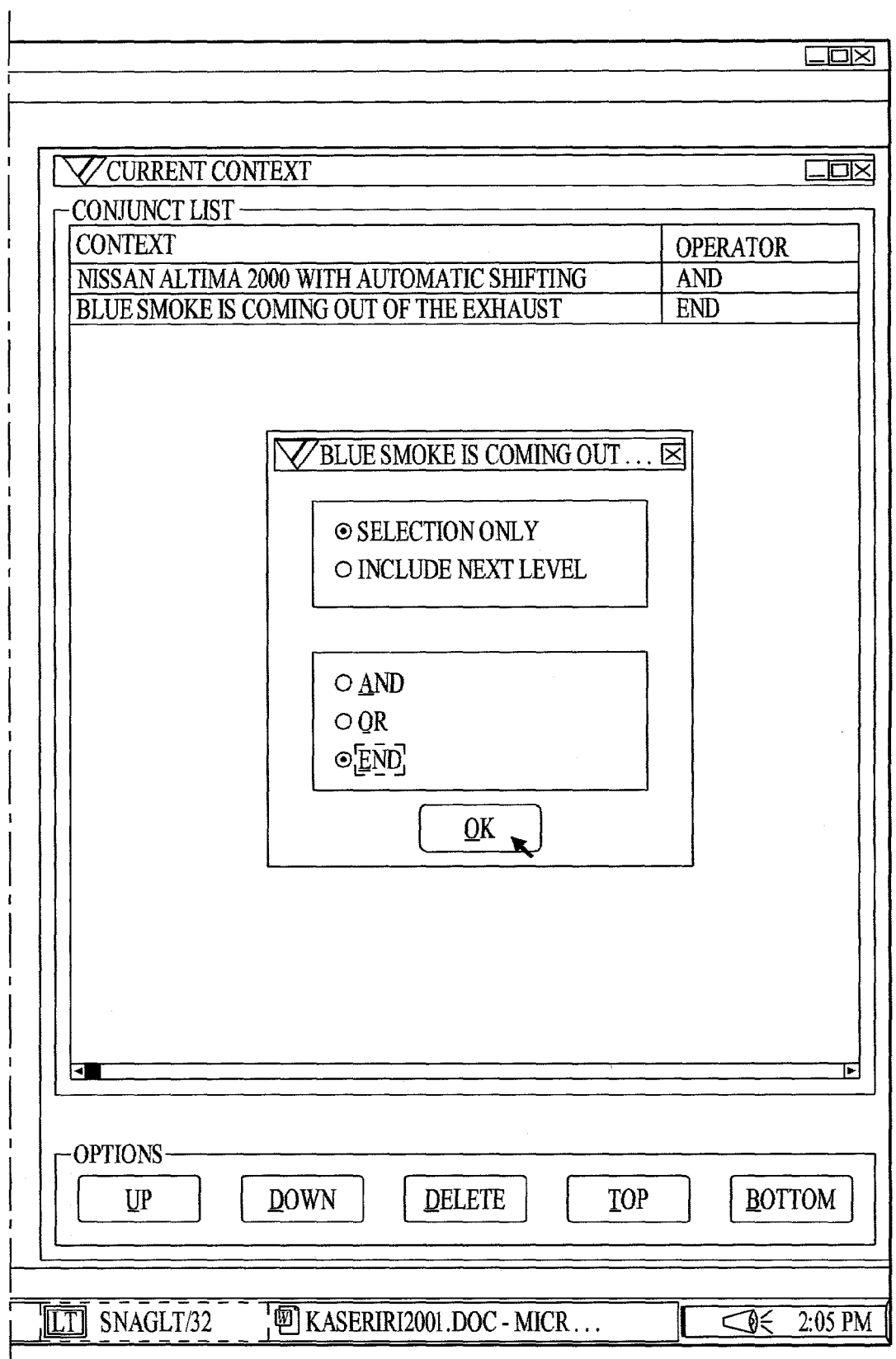

The context, "Nissan Altima 2000 with automatic shifting AND Blue smoke is coming out of the exhaust" is now selected. FIG. 6 is similar to FIG. 2. The change of context demonstrates the KASER's capability for qualitatively fuzzy matching.

Figure 7:
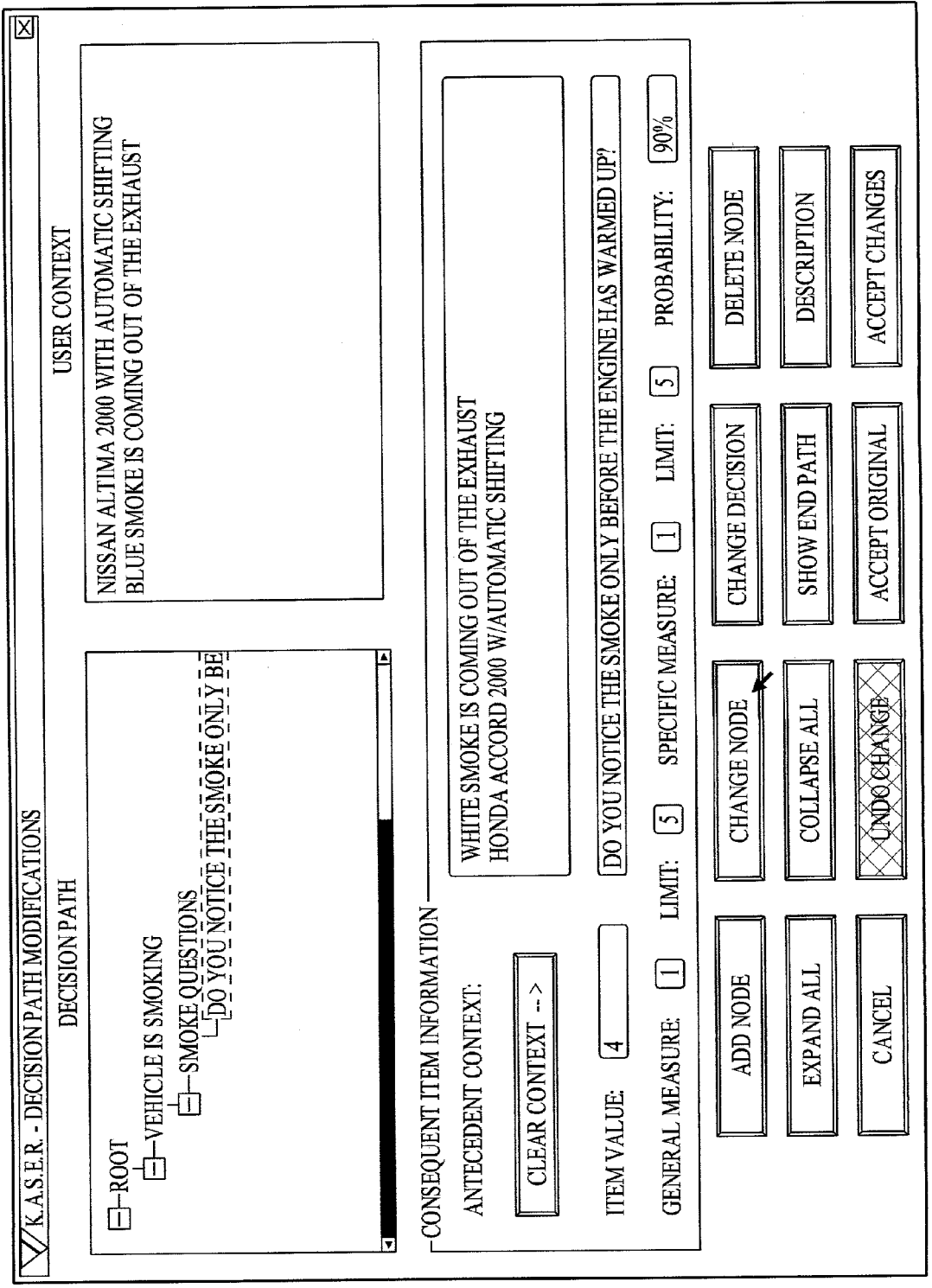
FIG. 7 illustrates a fuzzy contextual match with resultant decision path.

FIG. 7 is a fuzzy contextual match with resultant decision path. In FIG. 7, notice that the User Context and the matched Antecedent Context are similar, but different. In particular, the user specified a, "Nissan Altima 2000 with automatic shifting AND Blue smoke is coming out of the exhaust." The closest matching rule antecedent found is, "Honda Accord 2000 with automatic shifting AND White smoke is coming out of the exhaust." An ordered search algorithm found that this qualitatively fuzzy match minimizes the sum of attendant errors and required the use of at most one level of induction and one level of deduction to achieve. The matching predicates serve as a metaphorical explanation for derived consequent actions, if any.

The Decision Path shows the selected hierarchical path in the consequent object tree. As shown, "Vehicle is smoking," is followed by, "Smoke Questions," followed by smoke question instances. Questions are used to help the user complete an otherwise arduous contextual specification. The specified User Context is inducing the presentation of the question, "Do you notice the smoke only before the engine has warmed up?"

The Change Node button permits changing of the question presented. New questions or declarative statements may always be inserted through the use of the Add button (FIGS. 2 and 6). The Clear Context button replaces the Antecedent Context with the User Context so as to create a new user rule.

The functionality of some of the other buttons is as follows. The Add Node button allows the addition of a more specific node to the decision path. The Change Decision button allows the replacement of the selected node with any other consequent node. The Delete Node button deletes the selected node along with all of its children. The Expand All and Collapse All buttons are used to expand and contract the decision path respectively. The function of the Show End Path (Show Entire Path) buttons is similar, where the end path refers to the leaf nodes. The Description button provides a pop-up window that contains a textual description of the node, if present. The functionality of the remaining buttons is relatively self-descriptive.

Figure 8:
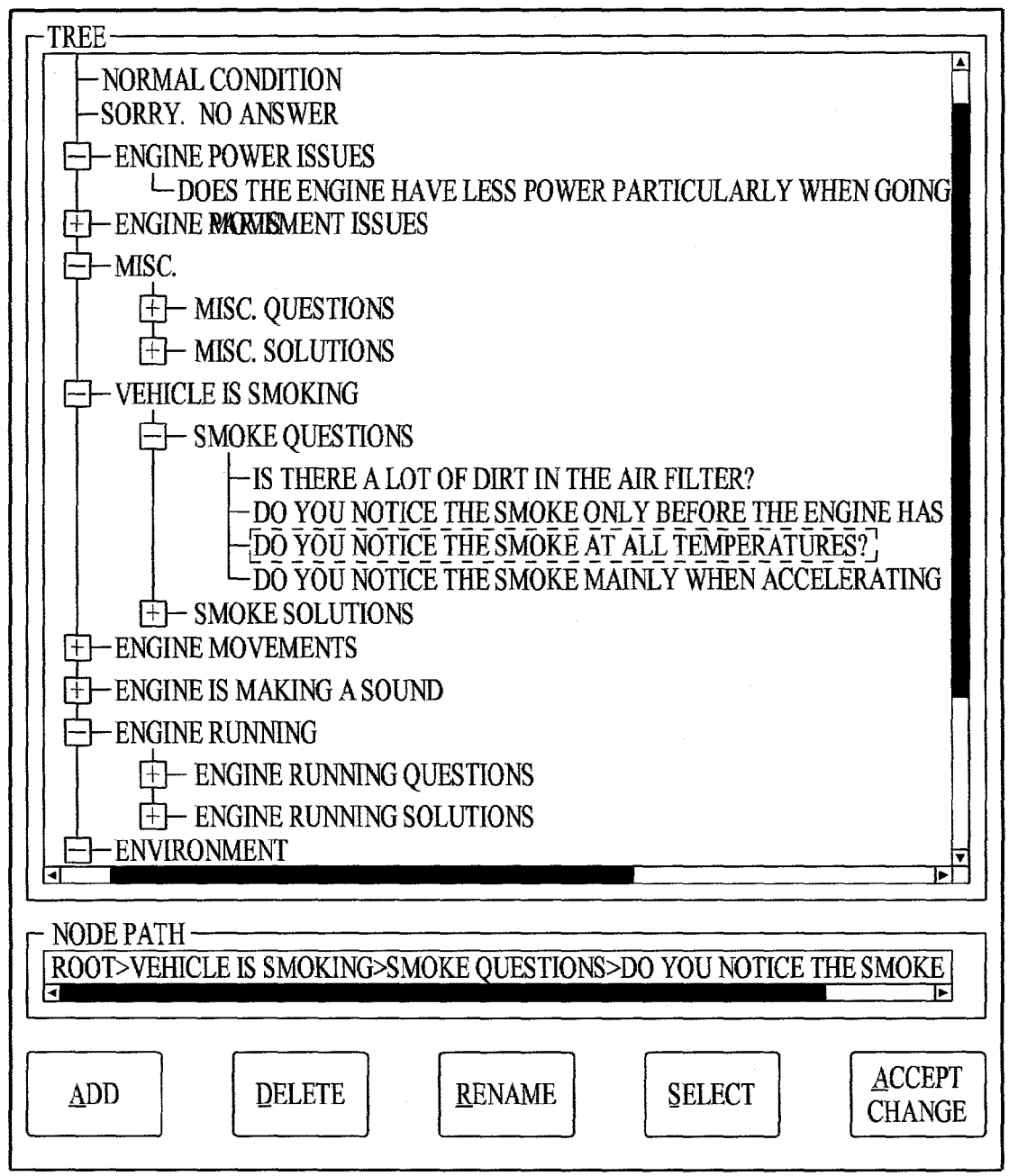
FIG. 8, illustrates the correction of an erroneous node.

Clicking on the Change Node button in FIG. 7 results in bringing up the consequent tree depicted in FIG. 8, which illustrates the correction of an erroneous node. The question is changed from, "Do you notice the smoke only before the engine has warmed up?" to "Do you notice the smoke at all temperatures?"

Figure 9:
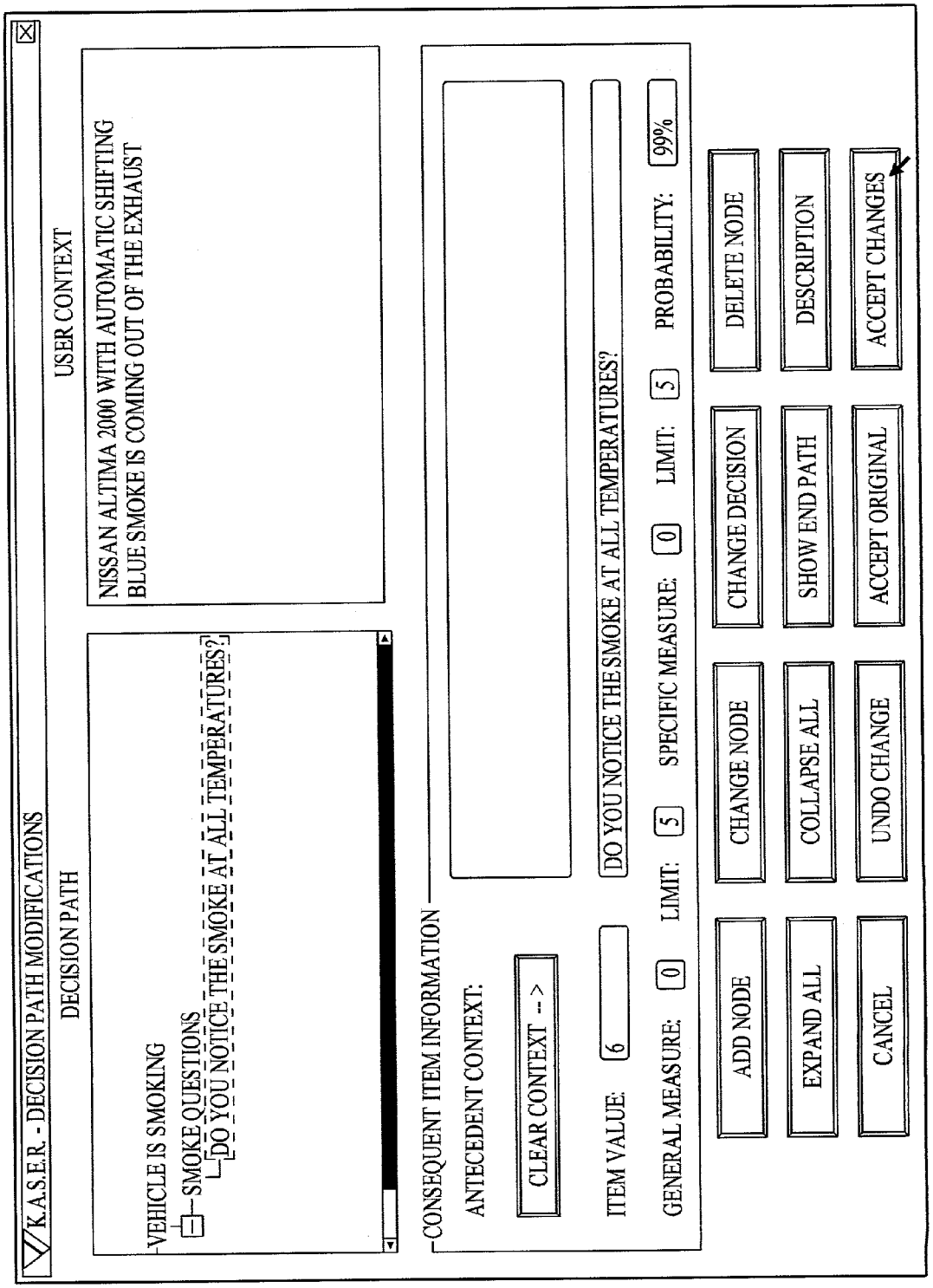
FIG. 9 illustrates the result of accepting a question change.

FIG. 9 depicts the result of accepting a question change. Notice that the Antecedent Context has been cleared. This is because there is presently no antecedent paired with the new consequent. Note that the stochastic measures are both zero. This is because the knowledge engineer supplies the new rule—certifying its validity.

Figure 10:
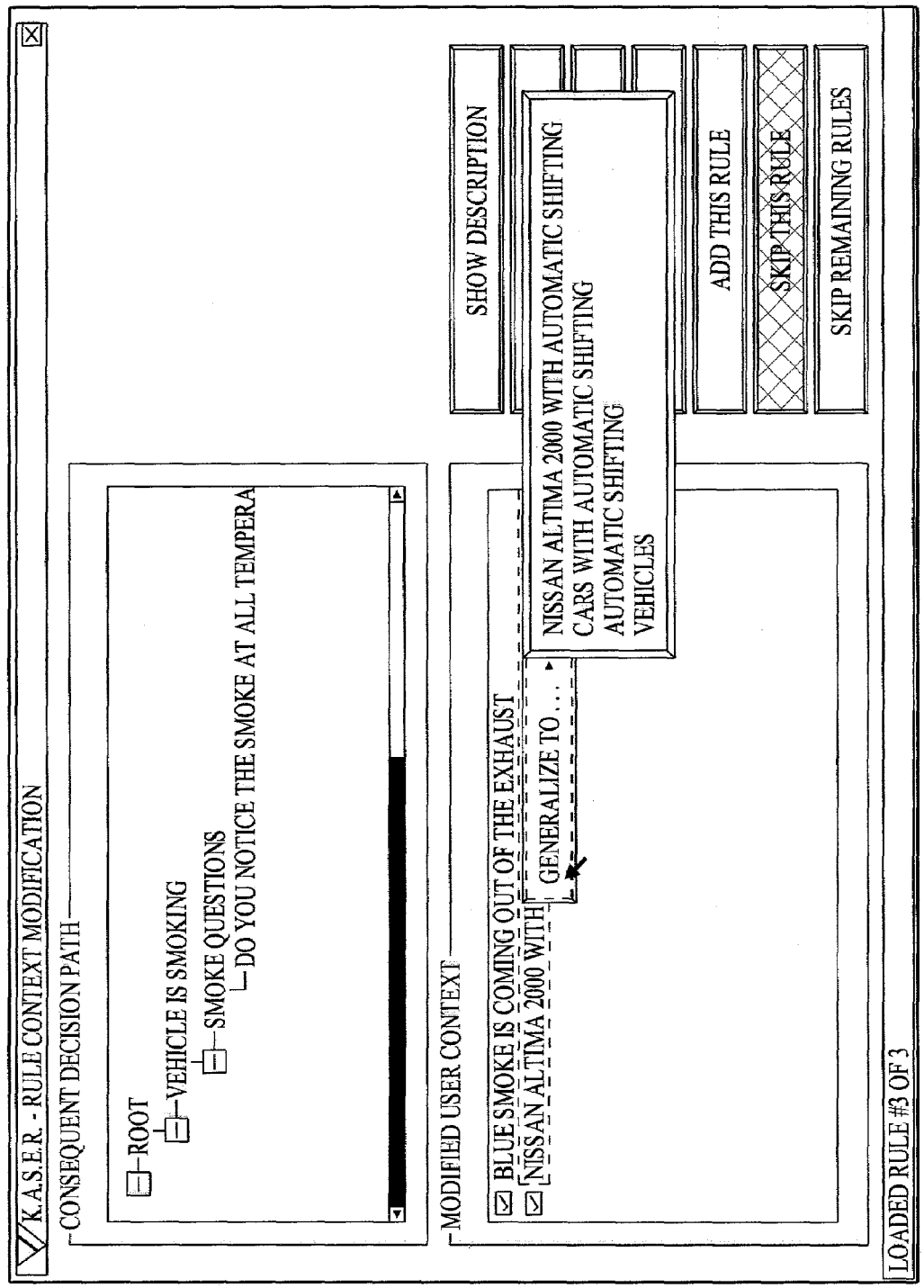
FIG. 10 illustrates the Rule Context Modification Window.

FIG. 10 illustrates the Rule Context Modification Window, which allows the knowledge engineer to generate a most general antecedent paired with the rule consequent. A more general antecedent implies a greater potential for reuse.

Contextual predicates are generalized through two means. First, unchecking a contextual predicate removes it from the antecedent. The resulting more general rule may then be checked for contradiction with the existing rule base by clicking on the Check Current Rule button, which is hidden in FIG. 10. Similarly, the knowledge engineer may also generalize an included predicate by right-clicking on it and selecting one from among the presented hierarchy of generalizations, if any. The resulting more general rule may then be checked for contradiction with the existing rule base as before.

Resulting rules may be acquired by clicking on the Add This Rule button. Clicking on the Skip This Rule button prevents its acquisition. In this case, a previously existing rule is relied upon to get to the next level, or the transition is not possible. Clicking on the Skip Remaining Rules button precludes the acquisition of any rules here. Using the Add This Rule button, a different rule (i.e., including different generalizations) may be added to effect transition level by level in the tree (e.g., precipitation to snow). This maximizes the potential reuse of knowledge because distinct rules may operate at distinct levels in the consequent object hierarchy. This is a key advantage associated with the use of the declarative object trees.

Figure 11:
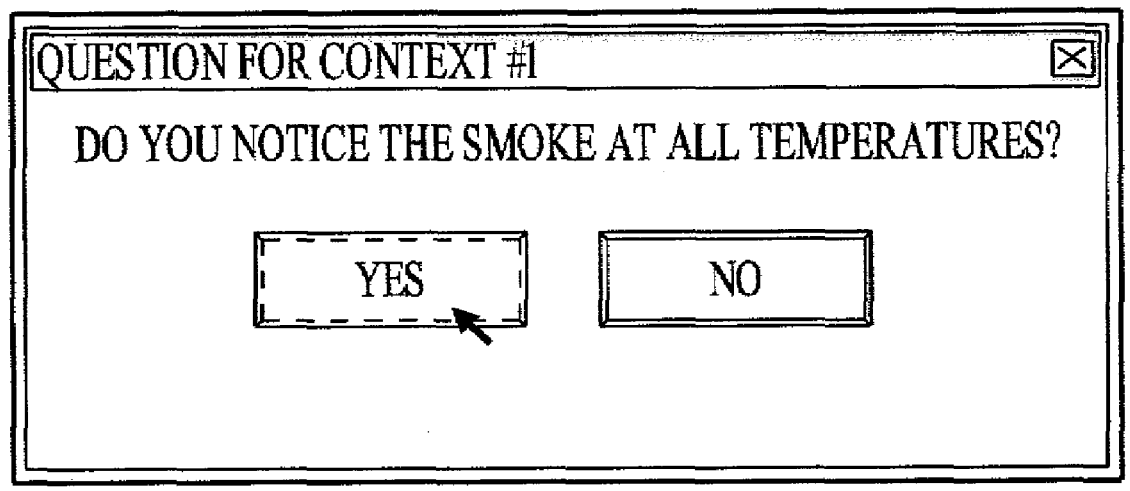
FIG. 11 illustrates the updated consequent question presented in a runtime window.
Figure 12:
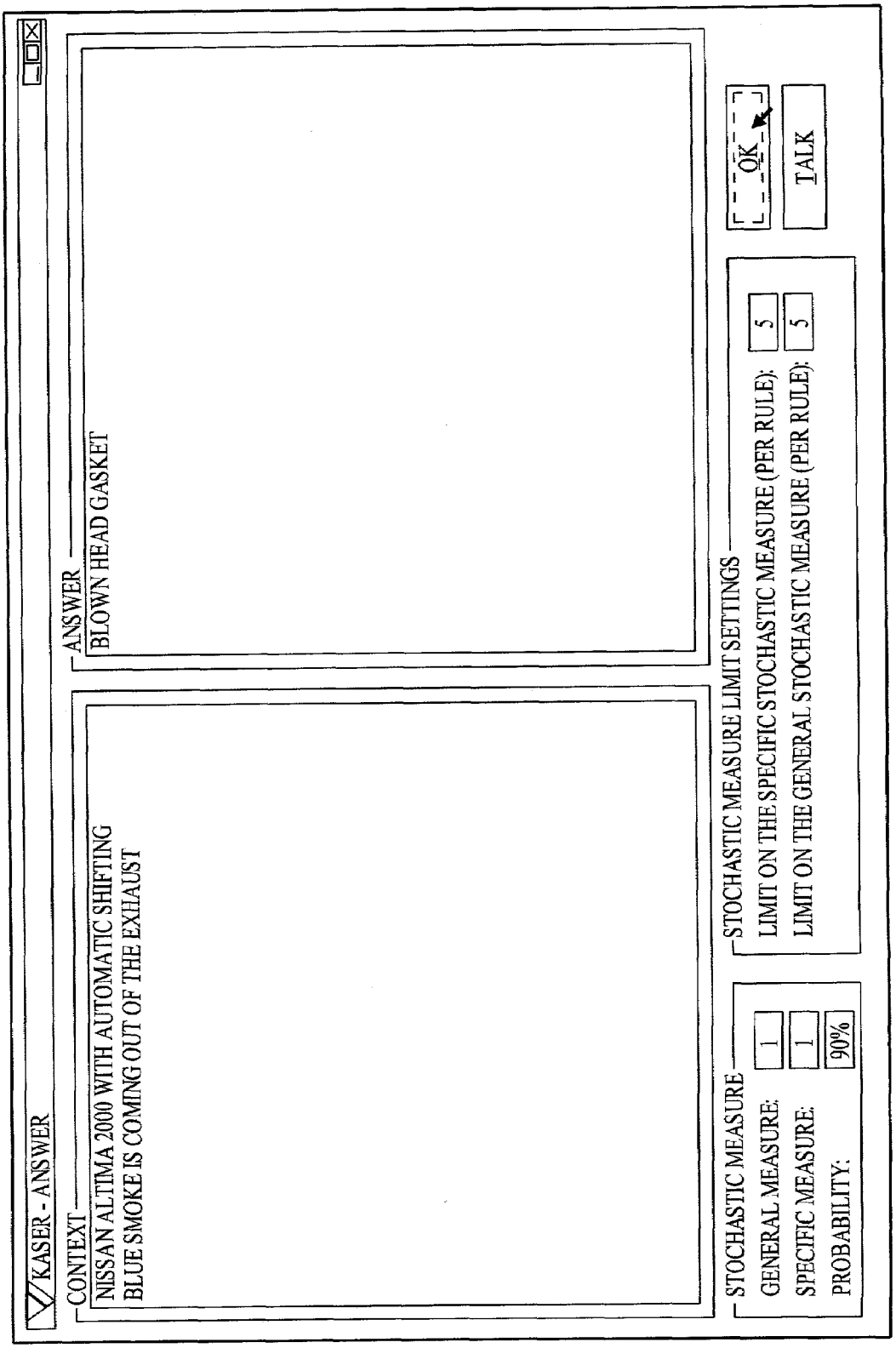
FIG. 12 illustrates an instance of the virtual rule space.

FIG. 11 depicts the updated consequent question presented in a runtime window. The context, "Nissan Altima 2000 with automatic shifting AND Blue smoke is coming out of the exhaust," is appended with the information that the "smoke is noticed at all temperatures." One level of generalization and specialization are minimally needed to match the resultant context against the present rule base. The answer that results is that there is a Blown Head Gasket. Notice that this diagnosis is not available through the knowledge base or real rule space and is open under strict deduction. Rather, it is synthesized at runtime through the creation of a much larger virtual rule space. A member of the virtual rule space is presented in FIG. 12.

The probability of error here is order proportionate to the magnitude of the General Stochastic Measure. It is also inherently dependent on the size of the existing knowledge base at the time and the degree of domain symmetry (see FIG. 16 described below). Erroneous rules require supervised correction. A property of the KASER is that the effects of any correction propagate supra-linearly and bear proportion to the degree of domain symmetry, as FIG. 16 demonstrates this on the basis of empirical evidence.

Figures 13, 13A:
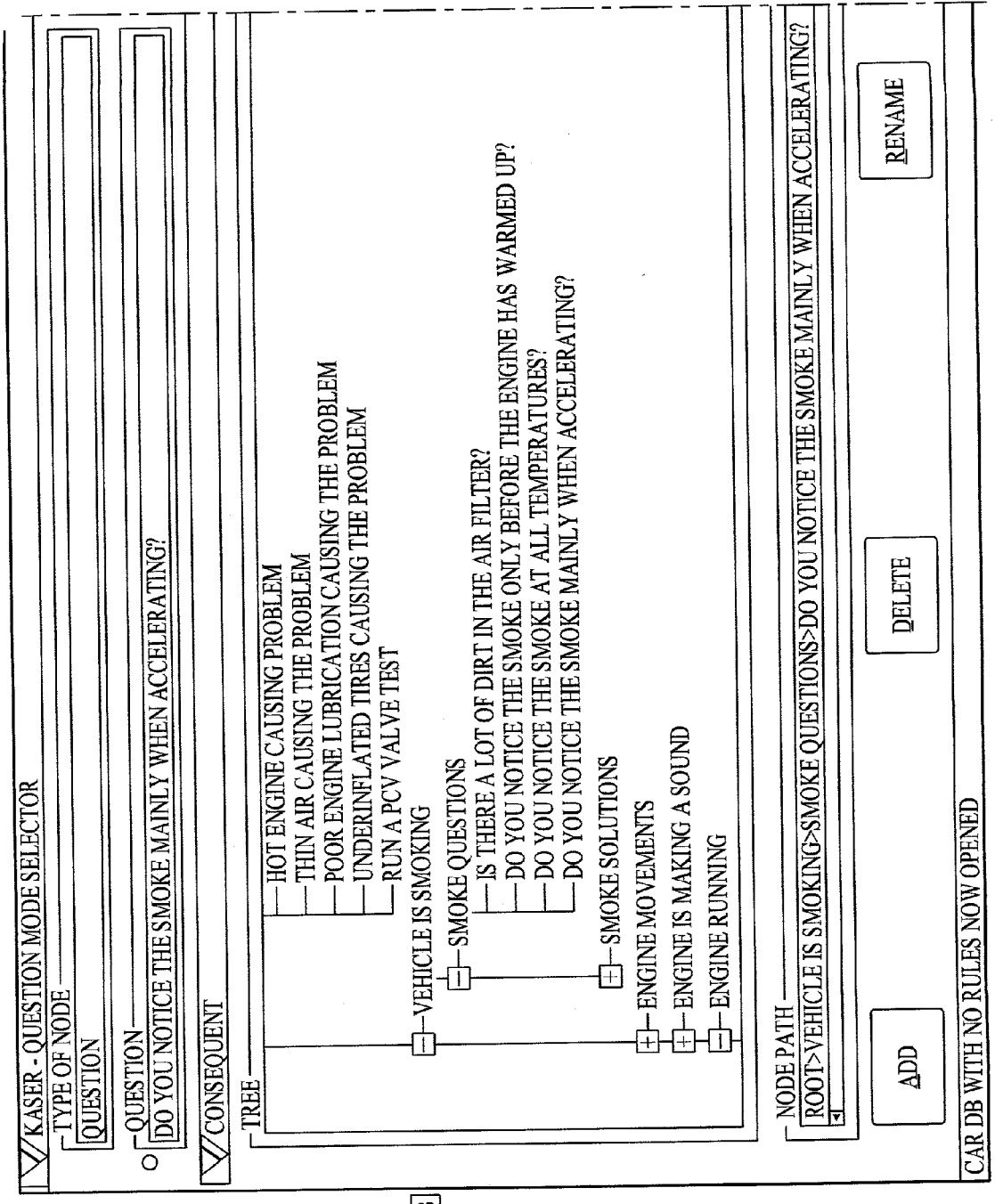
FIG. 13 illustrates the specification of a question.
Figure 13B:
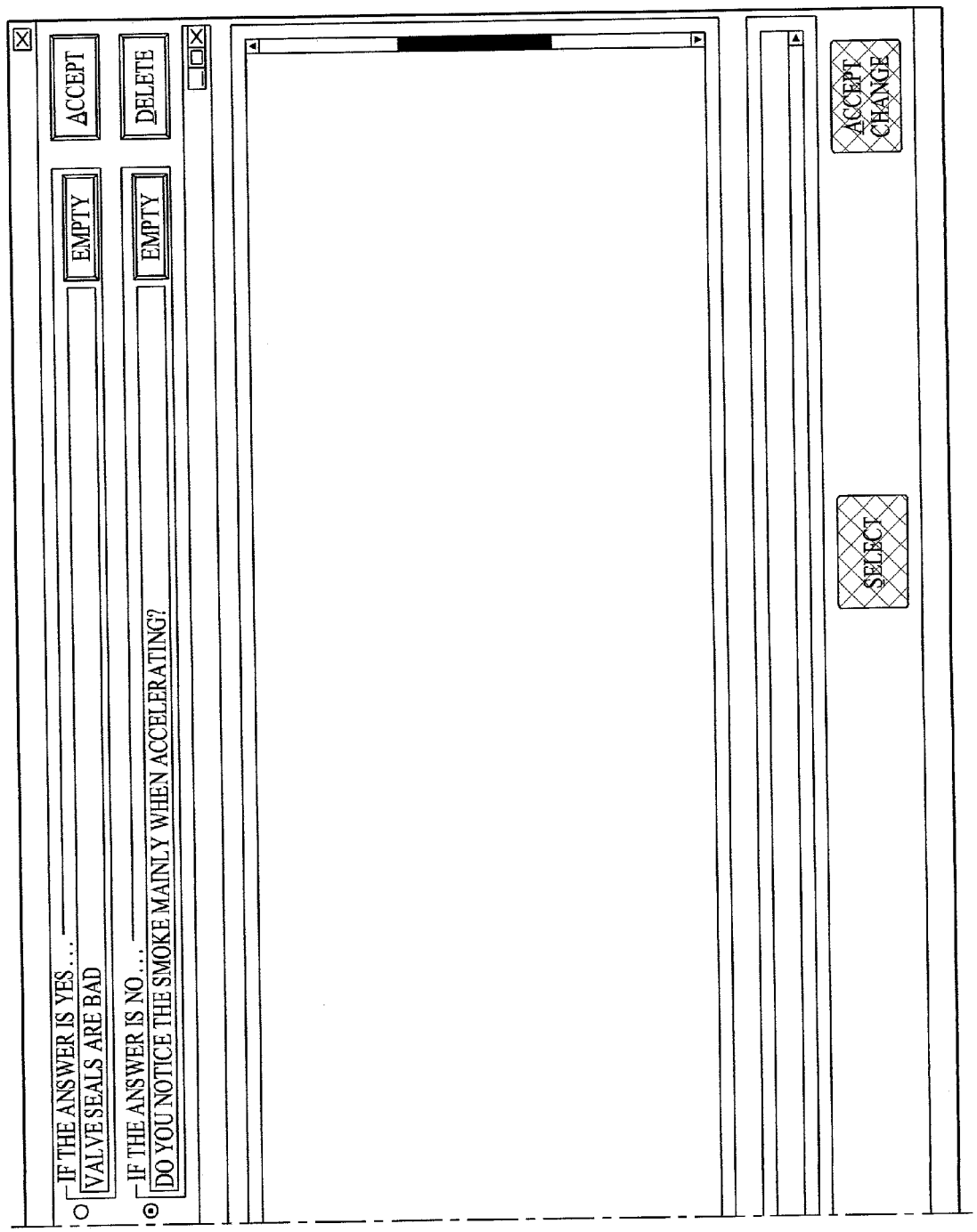

How the knowledge engineer (operator) specifies a question is next described. First, the operator selects the Question Mode from the Options menu. The type of node is entered as Question. Click on the Question radio button or click inside the associated text box. Then find and select the desired question in the consequent tree. It appears in the text box as shown in FIG. 13. The specification for, "If the Answer is Yes . . . " and "If the Answer is No . . . " follows suit. In particular, one question may bring up another question and so on for the effect of continually refining the context. The Empty buttons allow for the specification of different answers. The Accept or Delete buttons are used to complete the specification.

Figure 14A:
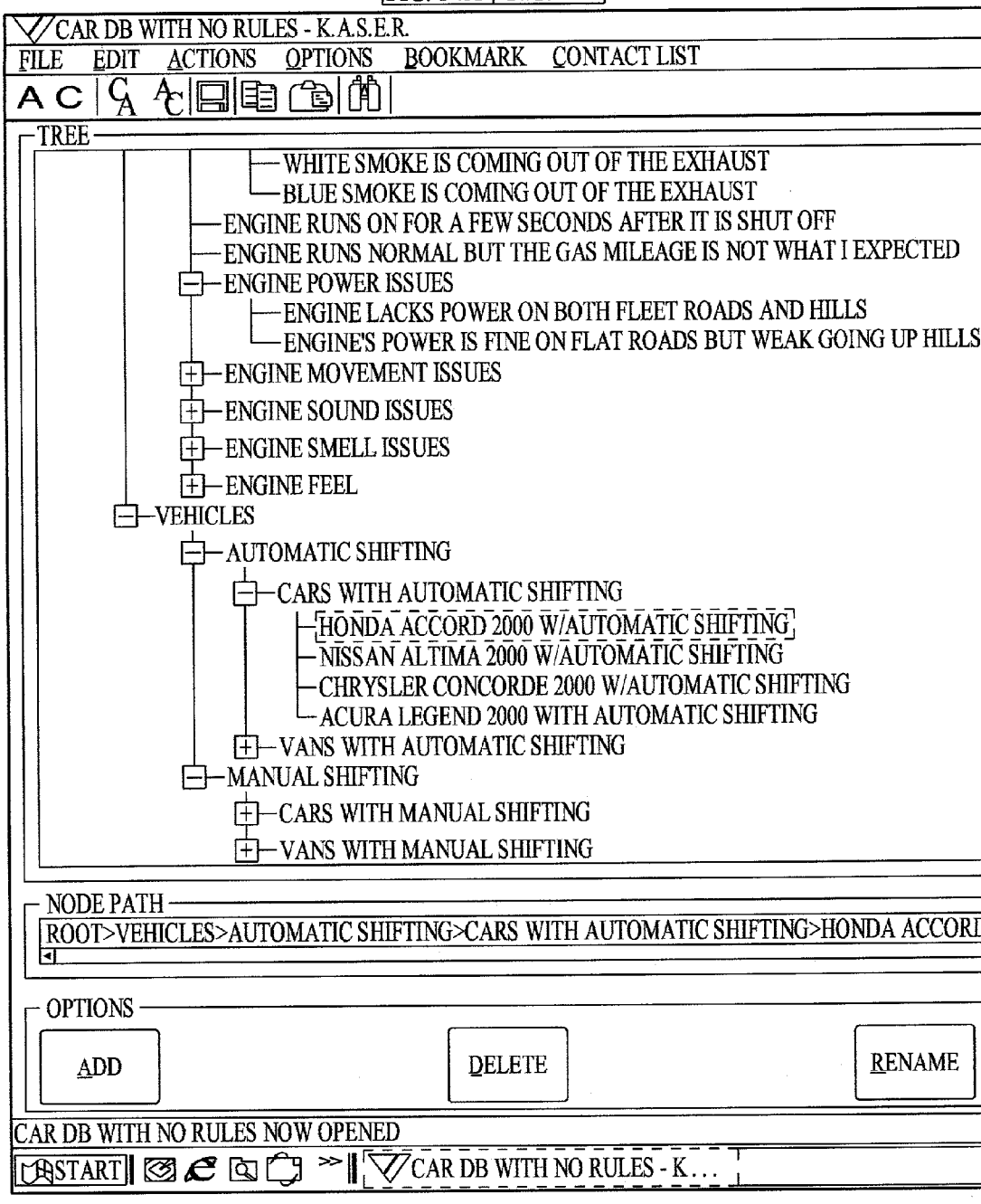
FIG. 14 illustrates the linking of image and multimedia objects to menu items.
Figure 14B:
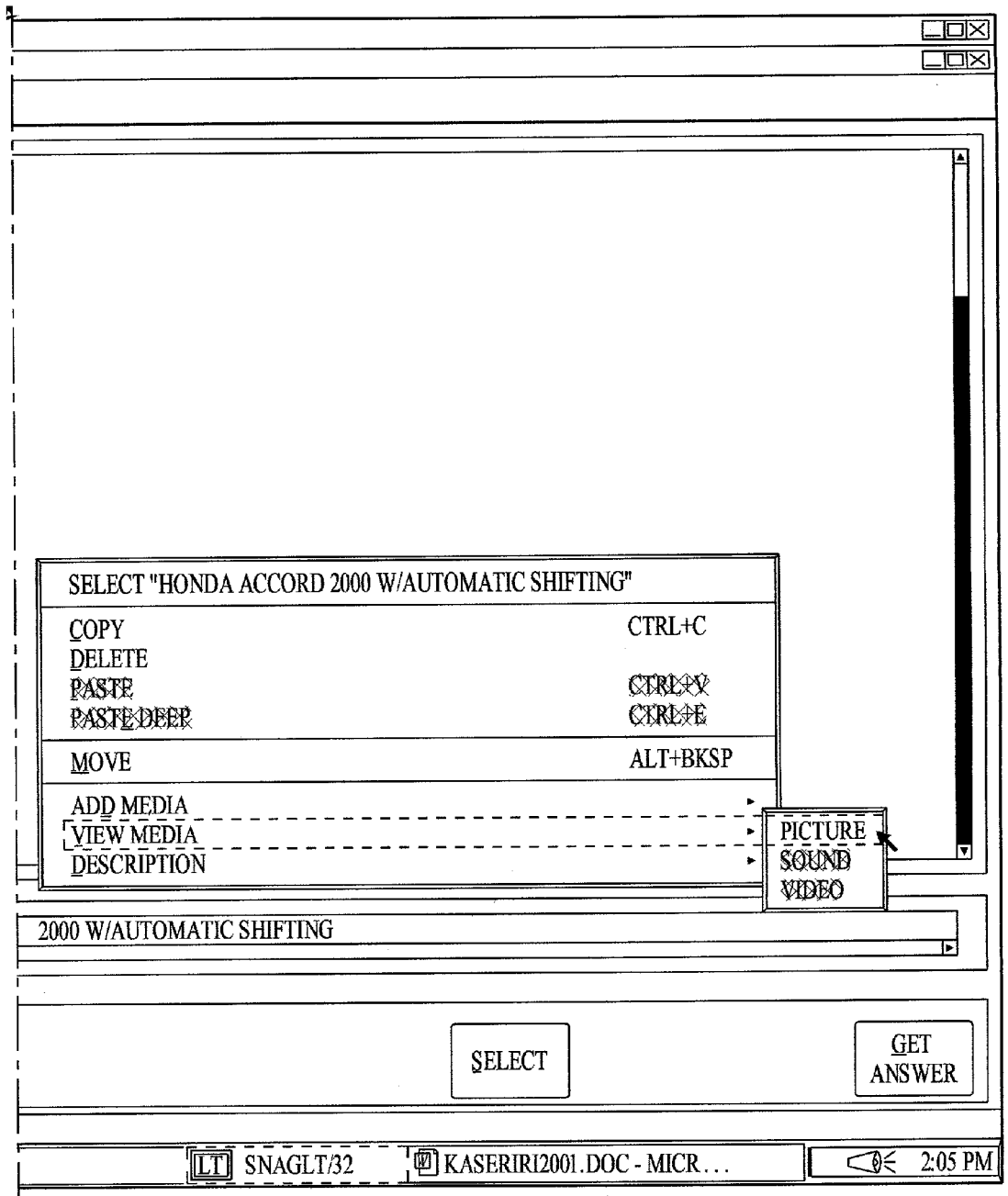
Figure 15B:
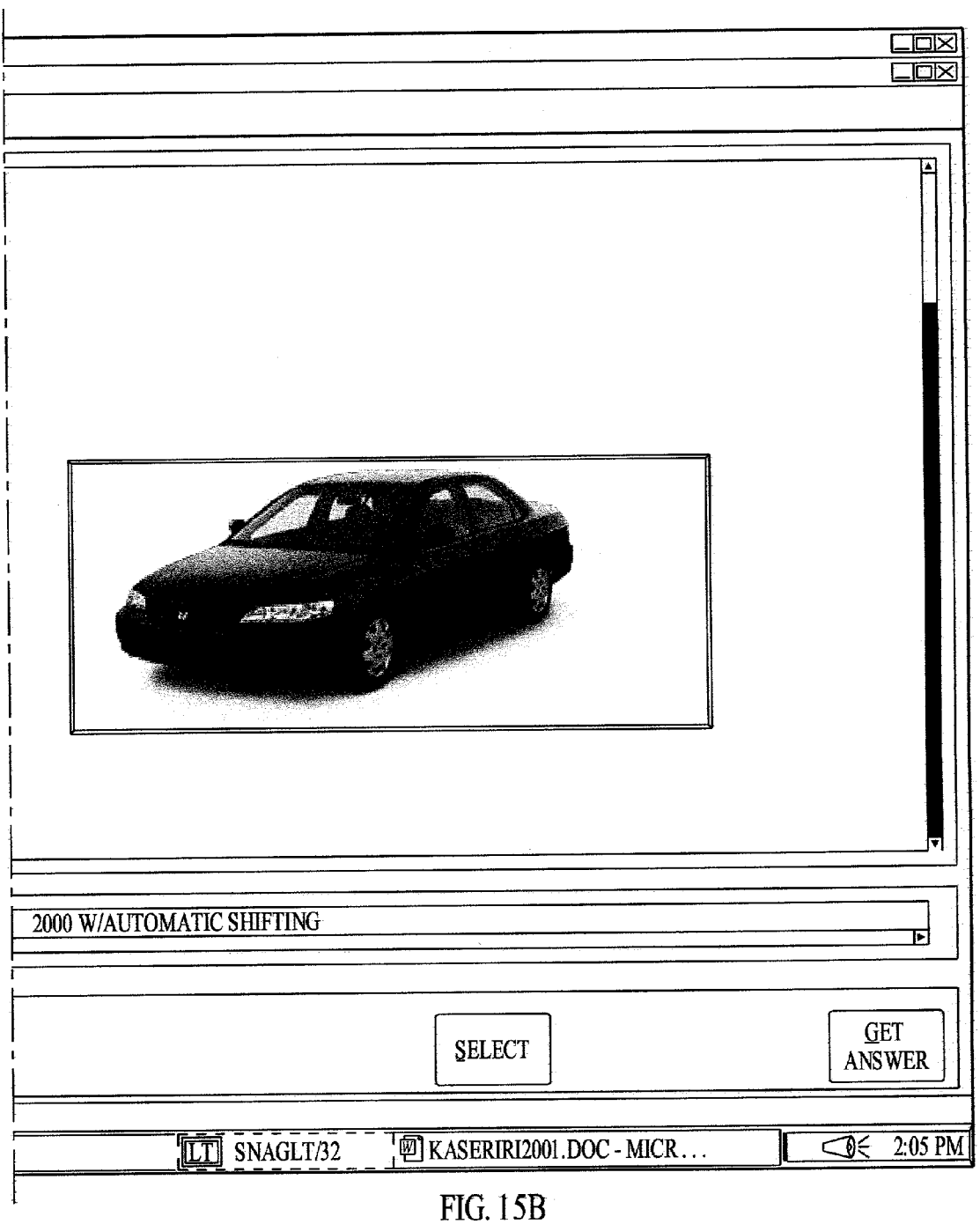
FIG. 15 illustrates the display of an image from the menu of FIG. 14.

The KASER, as implemented, goes beyond theory and includes application-oriented issues. Pictures, Sound, Video, and Text may be attached to an antecedent or consequent object. These attachments serve to enhance user understanding, memory, and perhaps most importantly serve to define that, which may otherwise be poorly understood. For example, in FIG. 14, an automobile may not necessarily be a Honda Accord 2000 with Automatic Shifting. By right-clicking on this object, a picture of it may be displayed to confirm this (FIG. 15).

Antecedent and consequent predicates may be attached with such picture multimedia as bitmap, .dib, .emf, gif, .ico, .jpg, and .wmf. Soundfiles such as .mp3 and .wav and video files such as .avi and .mpeg may also be attached to objects. The Description option allows the knowledge engineer to attach textual descriptions to predicates. Any predicate may have all or no multimedia attached.

Subtrees may be Copied and Deleted through the use of the appropriate commands. Individual nodes may be Pasted and entire subtrees may be Deep Pasted to wherever the mouse has been set.

The Move command provides for the movement of entire subtrees to different locations. If the Shift or Ctrl keys are used, then directed subclasses may be moved. For example, in an object list of apple types (e.g., Granny, McIntosh, Red Delicious, et al.), all of the red ones and all of the green ones may easily be moved into separate object menus under the apple class. The KASER then treats red and green apples as distinct classes where necessary for rule induction and/or deduction. Clearly, the provision for such exacting and evolving class formation provides the knowledge engineer with a powerful capability. The KASER learns many of the nuances of domain-specific human thought. This is something that a domain-general polynomial of weights, neural network, or equivalent can never do, as may be appreciated with reference to, for example, Lin et al. (supra)], Zadeh [L. A. Zadeh, "Fuzzy Logic Neural Networks and Soft Computing," *Comm ACM*, vol. 37, no. 3, pp. 77–84, 1994], or Chellapilla et al. [Chellapilla et al., "Evolution, Neural Networks, Games, and Intelligence," *Proc. IEEE*, vol. 87, no. 9, pp. 1471–96, 1999].

A .gif file view of a Honda 2000 Accord with Automatic Shifting is presented in FIG. 15. Notice how it serves to bring the system "to life".

Figure 16:
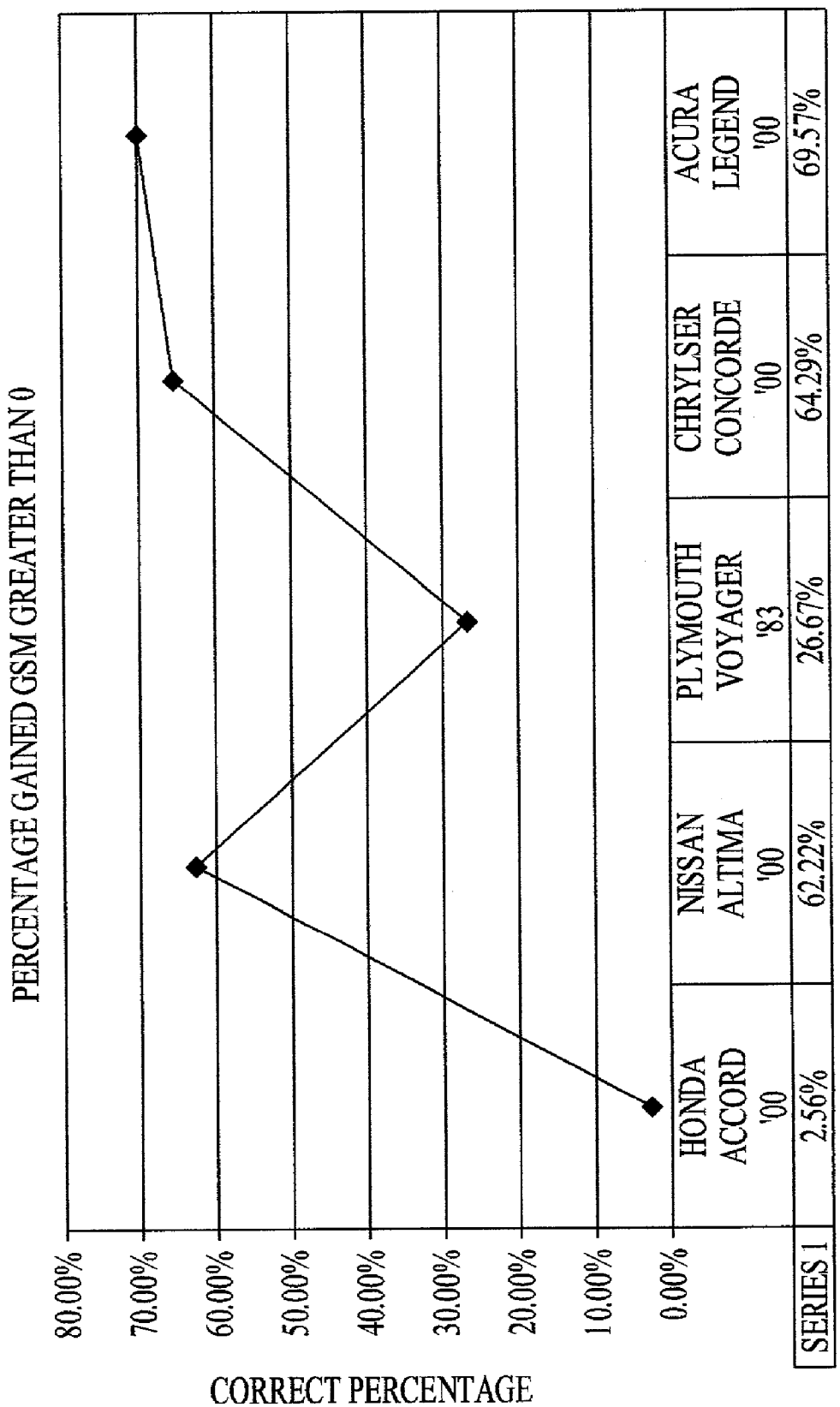
FIG. 16 is a graph illustrating exemplary empirical Type II KASER learning results for an automotive diagnostics domain.

FIG. 16 provides a graphical depiction of empirical KASER learning results for the domain of automotive diagnostics. The most stringent test of learning occurs where the General Stochastic Measure (GSM) is greater than zero and the yielded consequent is deemed correct. In other words, let us investigate the validity of virtual rules arrived at by inductive processes.

The KASER is "cold-started" for the Honda Accord. Note that before rule acquisition, the system must incorrectly predict a rule consequent. Only 2.56 percent of the 50 contexts presented to the system that result in a GSM>0 yield the correct consequent according to inventor experiments conducted with an oracle [Motor Trend AutoTech, *Software to Help You Troubleshoot Your Car, Truck, Van, or SUV* 1983–2001, EMAP USA, 2001]. The poor performance is attributed to the sparsely populated knowledge base. The Nissan is chosen as the next automobile because it is quite similar to a Honda in all of its salient features. The rule base at this point consists of 141 Honda rules and is then trained on Nissan rules. The KASER gives the correct consequent for 62.22 percent of the Nissan contexts, which results in a GSM>0. This striking improvement in performance may be attributed to knowledge transference from the Honda rules. In all, 120 rules were supplied for the Nissan.

A vehicle that is relatively random when compared to the Honda and the Nissan is chosen. Such a vehicle is the Plymouth Voyager. Experiments conducted by the inventors show that only 26.67 percent of the Voyager contexts that result in a GSM>0 give the correct consequent. In all, 164 rules were supplied for the Voyager. The drop in performance is expected and may be attributed to the relative lack of symmetry between the Voyager and the two cars. However, note that the percentage correct is still greater than that for the Honda due to transference.

The Chrysler Concorde is similar to the other cars. The KASER gets correct 64.29 percent of the Concorde contexts that result in a GSM>0. In all, 161 rules were supplied for the Concorde. The greater than two percent improvement in the percentage correct over the Nissan base may be attributed to transference from the Voyager.

Finally, the Acura Legend, which is similar to all the other cars, gets correct 69.57 percent of the Acura contexts that result in a GSM>0. In all, 154 rules were supplied for the Acura. This improvement may be attributed to domain symmetry. The KASER clearly does not lose its knowledge of cars and appears to approach an asymptote for inductive accuracy. Once the knowledge base is populated (e.g., as shown), this asymptote is a more a function of the degree of inherent domain symmetry. The supra-linear propagation of corrections is evident from knowledge gained from a single domain transfers to a plethora of similar domains. Clearly, as is demonstrated by FIG. 16, learning about cars facilitates learning about vans and vice versa.

The exemplary embodiment described above shows that the knowledge-acquisition bottleneck may be overcome. The KASER offers itself as a new more creative type of expert system. This third-generation expert system computes with words and employs qualitative fuzzy reasoning. It also may be said to fail softly and for this reason is not brittle. A KASER cannot be realized through the exclusive use of predicate logic as it embeds an inductive component. Furthermore, the KASER captures and represents much of the domain knowledge of a knowledge engineer and may also predict the likelihood of error. The KASER "reasons" by means of a gradient descent or ordered search algorithm, which minimizes error.

The KASER provides domain transference and supra-linear learning, which are related to the inherent degree of domain symmetry. It introduces the use of declarative object trees in expert systems. Such trees facilitate the capture of object-oriented semantic relations among rule predicates and thus serve the processes of metaphorical explanation as a consequence.

Figure 17:
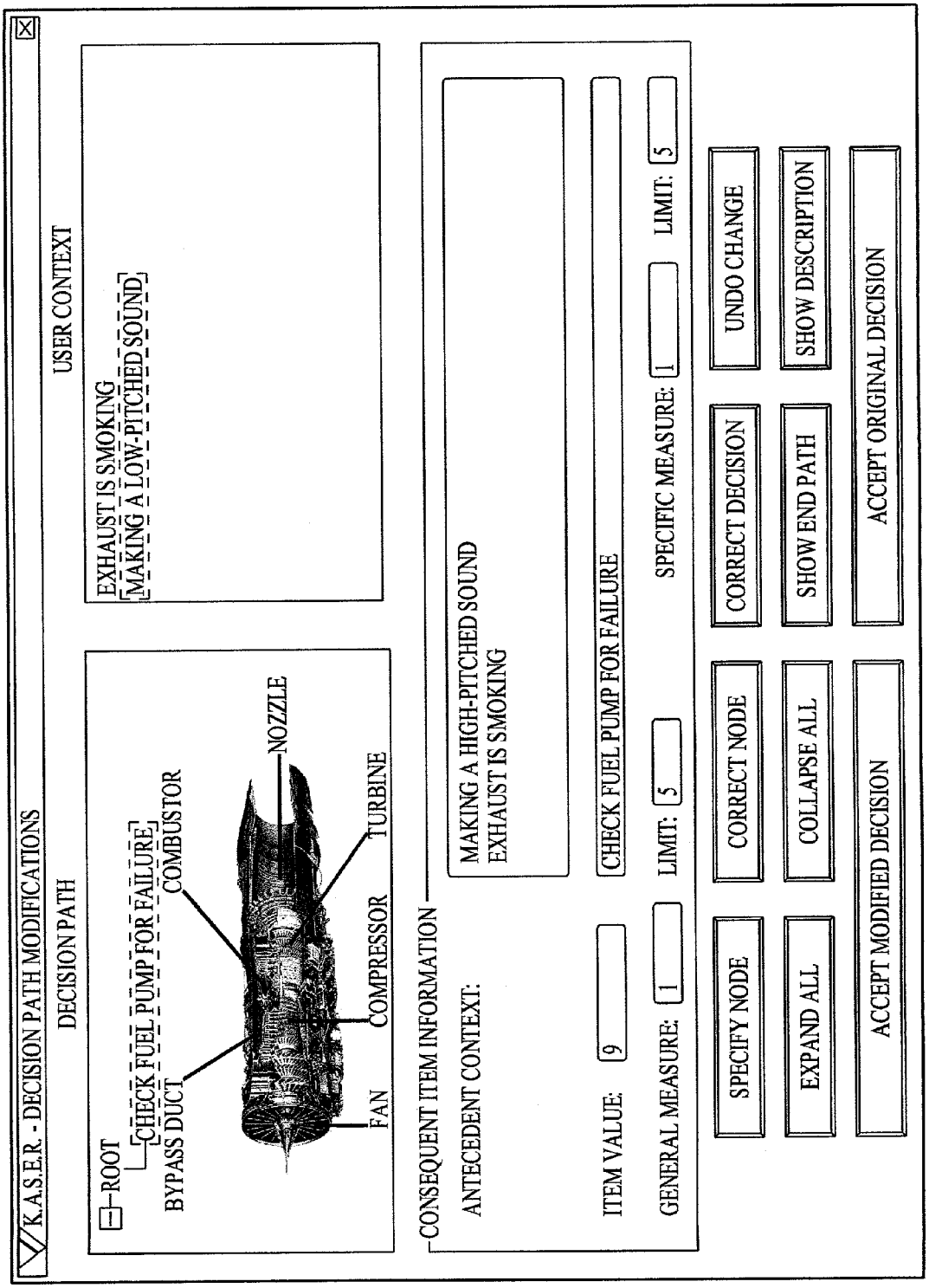
FIG. 17 illustrates a Type I KASER screen for diagnosing faults in a jet engine.

As another example, a screen capture of a Type I KASER for diagnosing faults in a jet engine is presented in FIG. 17. Note that the general and specific stochastics are the same. This means, in the case of the general stochastic, that the KASER needs to use one level of inductive inference to arrive at the prescribed action. Similarly, the specific stochastic indicates that one level of deduction is necessarily employed to arrive at this prescribed action. Contemporary expert systems have not been able to make a diagnosis and prescribe a course of action as they must be explicitly programmed with the necessary details. In contrast, the KASER of this invention offers a suggestion here that is open under a deductive process. It creates new and presumably correct knowledge. These are the two level-0 rules, supplied by the knowledge engineer (i.e., R15 and R16), that were used with the declarative object trees to arrive at the new knowledge, R18.

Figure 18:
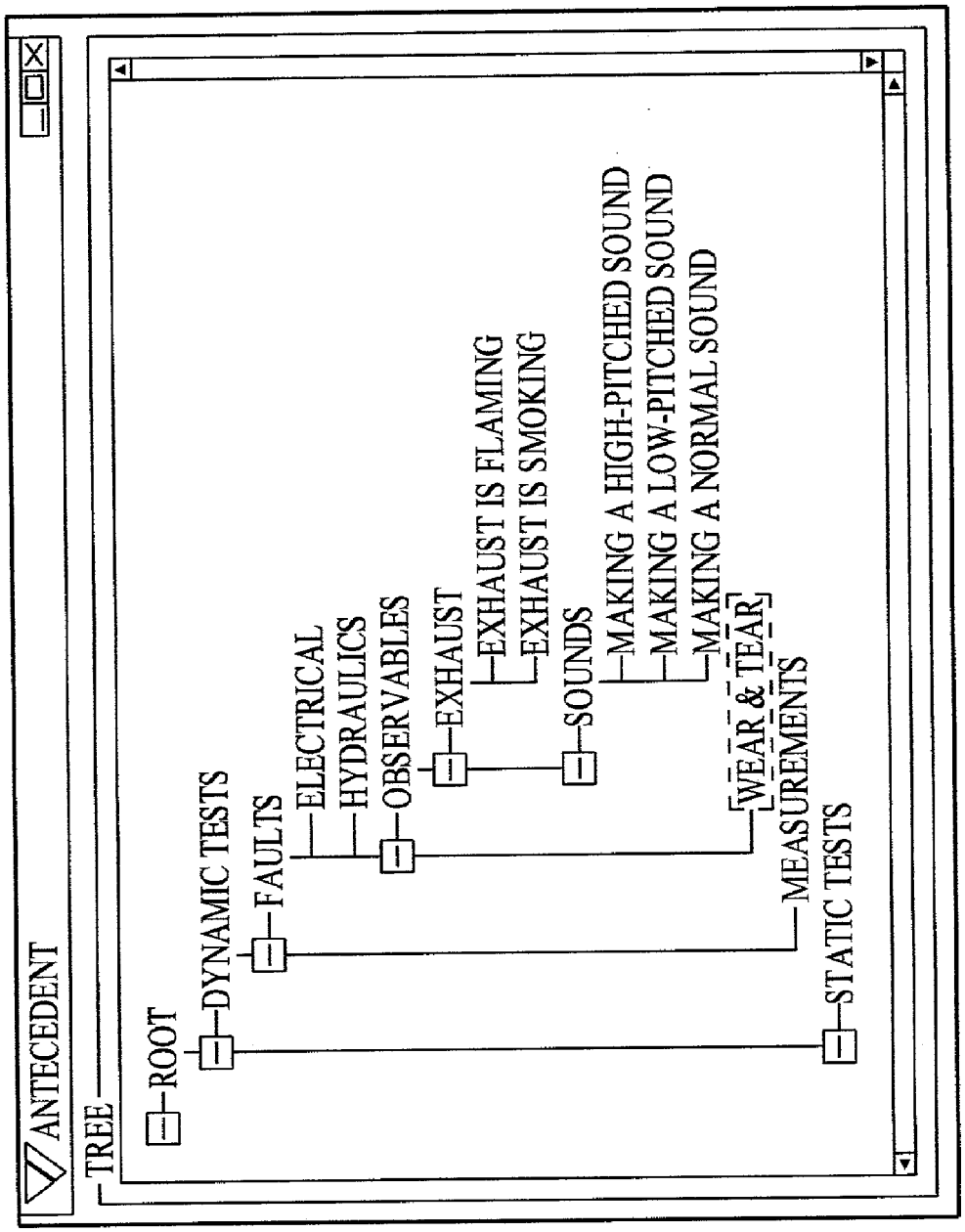
FIG. 18 illustrates a screen capture of an antecedent tree in the Type I KASER of FIG. 17.
Figure 19:
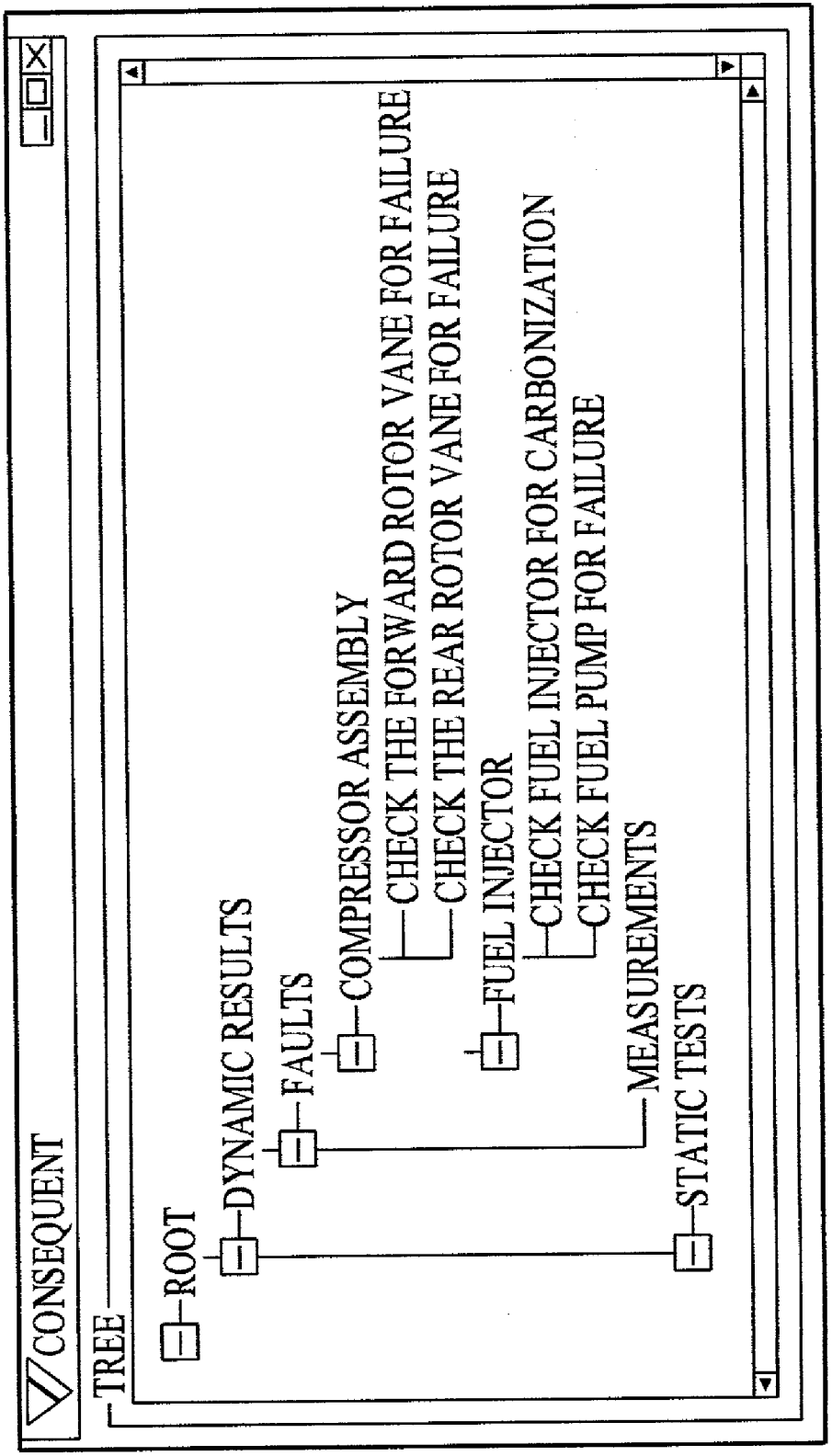
FIG. 19 illustrates a screen capture of a consequent tree in the Type I KASER of FIG. 17.

R15: If Exhaust Flaming and Sound Low-Pitched Then Check Fuel Injector for Carbonization
R16: If Exhaust Smokey and Sound High-Pitched Then Check Fuel Pump for Failure
R17: If Exhaust Smokey and Sound Low-Pitched Then Check Fuel Pump for Failure
 Upon confirmation of R17, R16 and R17 are unified as follows.
R18: If Exhaust Smokey and Sound Not Normal Then Check Fuel Pump for Failure The KASER finds declarative antecedent knowledge, which informs the system that the three sounds that an engine might make, subject to dynamic modification, are high-pitched, low-pitched, and normal sounds. By generalizing high-pitched sounds one level to SOUNDS (see FIG. 18) and then specializing it one level, a first-level analogy is developed—low-pitched sounds, which enables matching of the user context and leads to the creation of new knowledge. The consequent tree is depicted in FIG. 19 and is similar to the antecedent tree shown if FIG. 18. It is used to generalize rule consequents so as to maximize reusability. Object reuse may simultaneously occur at many levels; although, this example depicts only one level for the sake of clarity.

Another exemplary Type I KASER application is the automatic classification of radar signatures. As may be appreciated with reference to the above descriptions, the radar data is assigned a feature set in consultation with an expert. A commercial data-mining tool is then applied to the resulting large database to yield a set of rules and associated statistics. These rules are manually loaded into the Type I KASER, which interacts with the knowledge engineer to create the antecedent and consequent trees and a generalized rule base, for example. Upon completion of the manual acquisition process, the KASER is given a procedure to link it to an external electronic intelligence (ELINT) database, which supplies the radar signatures in approximate real-time. The signatures are then automatically classified by the KASER's virtual rule space and the generated stochastics provide an indication of reliability. The KASER, having a virtual rule space much larger than the real rule space may produce erroneous advice if the general stochastic is greater than zero. In this event, the user is requested to supply a corrective consequent(s), which may be "radioed" to the base computer for subsequent update on a daily basis, followed by uploading the more learned KASER. The main benefit here is that the KASER may supply solutions to complex signature-identification problems that are not cost effective to supply otherwise (see FIG. 1). A Type II KASER such as illustrated above in connection with FIGS. 2–15, should be able to automatically acquire the feature set.

Randomization theory holds that the human should supply novel knowledge exactly once (i.e., random input) and the machine extend that knowledge by way of capitalizing on domain symmetries (i.e., expert compilation). In the limit, novel knowledge may be furnished only by chance itself. This means that in the future, programming should become more creative and less detailed and thus the cost per line of code should rapidly decrease.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A machine-implemented method for organizing data representing symbolic information, the method comprising the steps of:
   (a) accepting and storing data having semantic content in a memory means;
   (b) adding an active randomized syntax to the semantic data in the memory means; and
   (c)) displaying data representing an inference corresponding to the semantic data on a display means.

2. The method of claim 1 further comprising the step of:
   (a.1) accepting the data from a user interface.

3. The method of claim 2 further comprising the step of:
   (a.1.1) accepting the data from a user interface responsive to the display on a display means of data representing an inference corresponding to the semantic data.

4. The method of claim 3 further comprising the step of:
   (c.1) identifying one or more inductive errors in the displayed data representing an inference; and
   (b.1) restructuring the active randomized syntax responsive to the one or more inductive errors.

5. The method of claim 4 further comprising the step of:
   (a.2) assigning the data having semantic content to objects in one or more declarative object trees each representing a hierarchy of instances of one or more rule and predicate classes.

6. The method of claim 1 further comprising the step of:
   (a.1) accepting the data from a processor interface responsive to a database query.

7. The method of claim 6 further comprising the steps of:
   (c.1) identifying one or more inductive errors in the displayed data representing an inference; and
   (d.1) restructuring the active randomized syntax responsive to the one or more 6 inductive errors.

8. The method of claim 7 further comprising the step of:
   (a.2) assigning the data having semantic content to objects in one or more declarative object trees each representing a hierarchy of instances of one or more rule and predicate classes.

9. The method of claim 1 further comprising the step of:
   (a.1) assigning the data having semantic content to objects in one or more declarative object trees each representing a hierarchy of instances of one or more rule and predicate classes.

10. The method of claim 1 further comprising the steps of:
    (c.1) identifying one or more inductive errors in the displayed data representing an inference; and
    (b.1) restructuring the active randomized syntax responsive to the one or more inductive errors.

11. A knowledge amplifier system comprising:
    input means for accepting data having semantic content;
    memory means coupled to the input means for storing the semantic data;
    processor means coupled to the memory means for adding a an active randomized syntax to the semantic data; and
    display means coupled to the processor means for displaying data representing an inference corresponding to the semantic data.

12. The system of claim 11 further comprising:
    coupled to the input means, a user interface for accepting the data from a user.

13. The system of claim 12 further comprising:
    coupled to the input means, means for accepting the data from the user interface responsive to the display on a display means of data representing an inference corresponding to the semantic data.

14. The system of claim 13 further comprising:
    coupled to the processor means,
        means for identifying one or more inductive errors in the displayed data representing an inference, and
        means for restructuring the active randomized syntax responsive to the one or more inductive errors.

15. The system of claim 14 further comprising:
    coupled to the input means, means for assigning the data having semantic content to objects in one or more declarative object trees each representing a hierarchy of instances of one or more rule and predicate classes.

16. The system of claim 11 further comprising:
    coupled to the processor means, means for accepting the data from a processor interface responsive to a database query.

17. The system of claim 16 further comprising:
    coupled to the processor means,
        means for identifying one or more inductive errors in the displayed data representing an inference, and
        means for restructuring the active randomized syntax responsive to the one or more inductive errors.

18. The system of claim 17 further comprising:
    coupled to the input means, means for assigning the data having semantic content to objects in one or more declarative object trees each representing a hierarchy of instances of one or more rule and predicate classes.

19. The system of claim 11 further comprising:
    coupled to the input means, means for assigning the data having semantic content to objects in one or more declarative object trees each representing a hierarchy of instances of one or more rule and predicate classes.

20. The system of claim 11 further comprising:
    coupled to the input means,
        means for identifying one or more inductive errors in the displayed data representing an inference, and
        means for restructuring the active randomized syntax responsive to the one or more inductive errors.

21. A computer program product comprising:
a data storage medium having computer-readable program code means embodied therein for causing a computer system to organize data representing symbolic information, the computer-readable program code means comprising:
computer-readable program code means for causing a computer to accept and store data having semantic content in a memory means;
computer-readable program code means for causing a computer to add an active randomized syntax to the semantic data in the memory means; and
computer-readable program code means for causing a computer to display data representing an inference corresponding to the semantic data on a display means.

* * * * *